United States Patent
Inoue et al.

(10) Patent No.: US 12,496,047 B2
(45) Date of Patent: Dec. 16, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventors: Tomoki Inoue, Kanagawa (JP); Yukiya Miyachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 327 days.

(21) Appl. No.: 17/015,420

(22) Filed: Sep. 9, 2020

(65) Prior Publication Data
US 2020/0397409 A1 Dec. 24, 2020

Related U.S. Application Data

(63) Continuation of application No. PCT/JP2019/003986, filed on Feb. 5, 2019.

(30) Foreign Application Priority Data

Mar. 28, 2018 (JP) .................. 2018-061579

(51) Int. Cl.
*A61B 8/00* (2006.01)
*A61B 8/06* (2006.01)
*A61B 8/08* (2006.01)

(52) U.S. Cl.
CPC .............. *A61B 8/5246* (2013.01); *A61B 8/06* (2013.01); *A61B 8/0891* (2013.01); *A61B 8/461* (2013.01)

(58) Field of Classification Search
CPC ....... A61B 8/5246; A61B 8/06; A61B 8/0891; A61B 8/461; A61B 8/0858; A61B 8/488
See application file for complete search history.

(56) References Cited

U.S. PATENT DOCUMENTS 4,509,526 A * 4/1985 Barnes .................. A61B 8/065
600/456
6,322,509 B1 * 11/2001 Pan ....................... G06T 7/0012
600/443
(Continued)

FOREIGN PATENT DOCUMENTS

CN 102525566 A 7/2012
EP 0842638 A2 5/1998
(Continued)

OTHER PUBLICATIONS

The extended European search report issued by the European Patent Office on Apr. 8, 2021, which corresponds to European Patent Application No. 19778372.3-1126 and is related to U.S. Appl. No. 17/015,420.

(Continued)

*Primary Examiner* — Jonathan Cwern
(74) *Attorney, Agent, or Firm* — Studebaker Brackett PLLC

(57) ABSTRACT

An ultrasound diagnostic apparatus includes a display that displays a B-mode image in which at least a blood vessel region is imaged; a processor configured to accept designation of a position of the blood vessel region on the B-mode image; detect a vascular wall by performing image analysis on the B-mode image on the basis of the designated position of the blood vessel region; calculate a cross-sectional area of a blood vessel on the basis of the detected vascular wall; set a Doppler gate within the blood vessel region on the B-mode image on the basis of the detected vascular wall; calculate a blood flow velocity on the basis of Doppler data in the Doppler gate; and measure a blood flow volume on the basis of the cross-sectional area of the blood vessel and the blood flow velocity, and display a measurement result on the display.

16 Claims, 19 Drawing Sheets

(56) References Cited

U.S. PATENT DOCUMENTS

| | | | |
|---|---|---|---|
| 6,464,641 B1 * | 10/2002 | Pan | A61B 8/13 600/453 |
| 2001/0016686 A1 * | 8/2001 | Okada | A61B 8/0858 600/454 |
| 2005/0203404 A1 * | 9/2005 | Freiburger | G01S 7/5208 600/453 |
| 2012/0108971 A1 | 5/2012 | Miyama et al. | |
| 2012/0310086 A1 | 12/2012 | Fukumoto et al. | |
| 2014/0276072 A1 * | 9/2014 | Martins | A61B 8/463 600/454 |
| 2015/0080729 A1 * | 3/2015 | Miyachi | A61B 8/0891 600/443 |
| 2017/0086780 A1 * | 3/2017 | Sokulin | A61B 8/5207 |

FOREIGN PATENT DOCUMENTS

| | | |
|---|---|---|
| EP | 1 152 364 B1 | 11/2001 |
| EP | 1152364 A2 | 11/2001 |
| JP | H10216129 A | 8/1998 |
| JP | 2002-52026 A | 2/2002 |
| JP | 2006-115937 A | 5/2006 |
| JP | 4749592 B2 | 8/2011 |
| JP | 5844325 B2 | 1/2016 |
| WO | 2011/099102 A1 | 8/2011 |

OTHER PUBLICATIONS

International Search Report issued in PCT/JP2019/003986; mailed Apr. 2, 2019.

Written Opinion issued in PCT/JP2019/003986; mailed Apr. 2, 2019.

Csurka et al.: Visual Categorization with Bags of Keypoints, Proc. of ECCV Workshop on Statistical Learning in Computer Vision, pp. 59-74 (2004).

Krizhevsk et al.: ImageNet Classification with Deep Convolutional Neural Networks, Advances in Neural Information Processing Systems 25, pp. 1106-1114 (2012).

An Office Action mailed by China National Intellectual Property Administration on Apr. 24, 2023, which corresponds to Chinese Patent Application No. 201980021786.6 and is related to U.S. Appl. No. 17/015,420; with English language translation.

Communication pursuant to Article 94(3) EPC issued by the European Patent Office on Apr. 11, 2023, which corresponds to European Patent Application No. 19778372.3-1126 and is related to U.S. Appl. No. 17/015,420.

Decision of Refusal mailed by China National Intellectual Property Administration on Apr. 16, 2024, which corresponds to Chinese Patent Application No. 201980021786.6 and is related to U.S. Appl. No. 17/015,420; with English language translation.

An Office Action mailed by China National Intellectual Property Administration on Dec. 28, 2023, which corresponds to Chinese Patent Application No. 201980021786.6 and is related to U.S. Appl. No. 17/015,420; with English language translation.

Communication pursuant to Article 94(3) EPC issued by the European Patent Office on May 2, 2024, which corresponds to European Patent Application No. 19778372.3 and is related to U.S. Appl. No. 17/015,420.

Communication pursuant to Article 94(3) EPC issued by the European Patent Office on Dec. 20, 2024, which corresponds to European Patent Application No. 19778372.3-1122 and is related to U.S. Appl. No. 17/015,420.

* cited by examiner

ULTRASOUND DIAGNOSTIC APPARATUS AND CONTROL METHOD OF ULTRASOUND DIAGNOSTIC APPARATUS

CROSS-REFERENCE TO RELATED APPLICATIONS

This application is a Continuation of PCT International Application No. PCT/JP2019/003986 filed on Feb. 5, 2019, which claims priority under 35 U.S.C § 119(a) to Japanese Patent Application No. 2018-061579 filed on Mar. 28, 2018. Each of the above application(s) is hereby expressly incorporated by reference, in its entirety, into the present application.

BACKGROUND OF THE INVENTION

1. Field of the Invention

The invention relates to an ultrasound diagnostic apparatus and a control method of the ultrasound diagnostic apparatus, and particularly to an ultrasound diagnostic apparatus and a control method of the ultrasound diagnostic apparatus which detect a vascular wall in a B-mode image.

2. Description of the Related Art

In the related art, an ultrasound diagnostic apparatus has been known as an apparatus for obtaining an image of the inside of a subject. The ultrasound diagnostic apparatus generally comprises an ultrasound probe comprising a transducer array in which a plurality of elements are arranged. In a state where the ultrasound probe is in contact with a body surface of the subject, an ultrasound beam is transmitted toward the subject from the transducer array and an ultrasound echo from the subject is received by the transducer array so that element data is acquired. Further, the ultrasound diagnostic apparatus electrically processes the obtained element data to generate an ultrasound image of the corresponding site of the subject.

For example, JP2002-052026A discloses an ultrasound diagnostic apparatus which installs a Doppler gate on the B-mode image, sets a circular search region centered on a center point of the Doppler gate, and searches for B-mode intensity data outwards from the center along radial lines over an entire 360° range of the search region to detect a vascular wall.

SUMMARY OF THE INVENTION

With the ultrasound diagnostic apparatus in JP2002-052026A, it is possible to adjust the position and size of the Doppler gate on the basis of the detected vascular wall and to select an optimal steering angle.

However, for example, in a case where a blood flow volume is measured in the ultrasound diagnostic apparatus disclosed in JP2002-052026A, it is possible to measure a blood flow velocity using the Doppler gate, but it is necessary to separately measure a cross-sectional area of a blood vessel in addition to the measurement of the blood flow velocity and to calculate the blood flow volume on the basis of the measured cross-sectional area and the blood flow velocity. In this way, in order to obtain a blood flow volume, a user has to perform an additional operation on the ultrasound diagnostic apparatus, which requires a great deal of time and effort.

The invention has been made in order to solve such a problem in the related art, and an object of the invention is to provide an ultrasound diagnostic apparatus and a control method of the ultrasound diagnostic apparatus which can easily measure a blood flow volume in a short time.

In order to achieve the object, an ultrasound diagnostic apparatus according to an aspect of the invention comprises a display unit that displays a B-mode image in which at least a blood vessel region is imaged; a position designation acceptance unit that accepts designation of a position of the blood vessel region on the B-mode image from a user; a vascular wall detection unit that detects an anterior vascular wall and a posterior vascular wall by performing image analysis on the B-mode image on the basis of the designation of the position of the blood vessel region by the user which is accepted by the position designation acceptance unit; a cross-sectional area calculation unit that calculates a cross-sectional area of a blood vessel on the basis of the anterior vascular wall and the posterior vascular wall detected by the vascular wall detection unit; a gate setting unit that sets a Doppler gate within the blood vessel region on the B-mode image on the basis of the anterior vascular wall and the posterior vascular wall detected by the vascular wall detection unit; a Doppler processing unit that calculates a blood flow velocity on the basis of Doppler data in the Doppler gate; and a blood flow volume measurement unit that measures a blood flow volume on the basis of the cross-sectional area of the blood vessel calculated by the cross-sectional area calculation unit and the blood flow velocity calculated by the Doppler processing unit, and displays a measurement result on the display unit, in which in a case where the position designation acceptance unit accepts the designation of the position of the blood vessel region from the user, the measurement result of the blood flow volume is automatically displayed on the display unit.

The vascular wall detection unit may include a blood vessel region detection unit that detects the blood vessel region by performing the image analysis on the B-mode image, and a closed section setting unit that sets a closed section which includes the position designated by the user through the position designation acceptance unit and of which the blood vessel region detected by the blood vessel region detection unit passes through an inside, and the anterior vascular wall and the posterior vascular wall may be detected within the closed section set by the closed section setting unit.

In this case, the vascular wall detection unit may detect a contour of the blood vessel region within the closed section as the anterior vascular wall and the posterior vascular wall.

Alternatively, the vascular wall detection unit may include a blood vessel gradient detection unit that detects a blood vessel gradient on the basis of the blood vessel region detected by the blood vessel region detection unit, and the anterior vascular wall and the posterior vascular wall may be detected by performing search in a direction perpendicular to the blood vessel gradient detected by the blood vessel gradient detection unit.

Further, the vascular wall detection unit may detect the anterior vascular wall and the posterior vascular wall by performing search along a gradient perpendicular line extending perpendicular to the blood vessel gradient detected by the blood vessel gradient detection unit.

Alternatively, the vascular wall detection unit may set an upper detection region and a lower detection region each having a predetermined range on the basis of a contour of the blood vessel region within the closed section, detect the anterior vascular wall within the upper detection region, and detect the posterior vascular wall within the lower detection region.

Further, the vascular wall detection unit may include an image rotation unit that rotates the B-mode image by the blood vessel gradient detected by the blood vessel gradient detection unit such that the blood vessel region extends horizontally, and a smoothing unit that performs smoothing processing along a horizontal direction on the B-mode image rotated by the image rotation unit, and the vascular wall detection unit may detect the anterior vascular wall and the posterior vascular wall on the B-mode image smoothed by the smoothing unit.

Further, a gradient modification acceptance unit that accepts a modification of the blood vessel gradient by the user may be further provided, and the vascular wall detection unit may detect again the anterior vascular wall and the posterior vascular wall by performing search in a direction perpendicular to the blood vessel gradient modified on the basis of the modification of the blood vessel gradient by the user which is accepted by the gradient modification acceptance unit.

It is preferable that the gate setting unit sets the Doppler gate such that the Doppler gate is positioned on an inner side of the anterior vascular wall and the posterior vascular wall detected by the vascular wall detection unit.

Further, an average blood flow velocity calculation unit that calculates an average blood flow velocity for one heartbeat period on the basis of the blood flow velocity calculated by the Doppler processing unit may be further provided, and the blood flow volume measurement unit may measure a blood flow volume on the basis of the cross-sectional area of the blood vessel calculated by the cross-sectional area calculation unit and the average blood flow velocity calculated by the average blood flow velocity calculation unit.

Further, the Doppler processing unit may generate a Doppler waveform image on the basis of the Doppler data in the Doppler gate, and the display unit may display the B-mode image and the Doppler waveform image.

A control method of an ultrasound diagnostic apparatus according to another aspect of the invention comprises displaying a B-mode image in which at least a blood vessel region is imaged; accepting designation of a position of the blood vessel region on the B-mode image from a user; detecting an anterior vascular wall and a posterior vascular wall by performing image analysis on the B-mode image on the basis of the accepted designation of the position of the blood vessel region by the user; calculating a cross-sectional area of a blood vessel on the basis of the detected anterior vascular wall and the detected posterior vascular wall; setting a Doppler gate within the blood vessel region on the B-mode image on the basis of the detected anterior vascular wall and the detected posterior vascular wall; calculating a blood flow velocity on the basis of Doppler data in the Doppler gate; and measuring a blood flow volume on the basis of the calculated cross-sectional area of the blood vessel and the calculated blood flow velocity, and displaying a measurement result, in which in a case where the designation of the position of the blood vessel region by the user is accepted, the measurement result of the blood flow volume is automatically displayed.

According to the invention, since there are provided the position designation acceptance unit that accepts the designation of the position of the blood vessel region on the B-mode image from a user; the vascular wall detection unit that detects the anterior vascular wall and the posterior vascular wall by performing image analysis on the B-mode image on the basis of the designation of the position of the blood vessel region by the user which is accepted by the position designation acceptance unit; the cross-sectional area calculation unit that calculates the cross-sectional area of the blood vessel on the basis of the anterior vascular wall and the posterior vascular wall detected by the vascular wall detection unit; the Doppler processing unit that calculates the blood flow velocity on the basis of Doppler data in the Doppler gate; and the blood flow volume measurement unit that measures the blood flow volume on the basis of the cross-sectional area of the blood vessel calculated by the cross-sectional area calculation unit and the blood flow velocity calculated by the Doppler processing unit, and displays the measurement result on the display unit, and in a case where the position designation acceptance unit accepts the designation of the position of the blood vessel region from the user, the measurement result of the blood flow volume is automatically displayed on the display unit, it is possible to easily measure the blood flow volume in a short time.

DESCRIPTION OF THE PREFERRED EMBODIMENTS

Hereinafter, embodiments of the invention will be described with reference to the accompanying drawings.

The description of constituents described below is given based on the representative embodiment of the invention, but the invention is not limited to such an embodiment.

In the present specification, a numerical range represented using "to" means a range including the numerical values before and after "to" as a lower limit value and an upper limit value.

In addition, in the present specification, the terms "perpendicular" and "parallel" include a range of error allowed in the technical field to which the invention belongs. For example, the terms "perpendicular" and "parallel" mean a range less than ±10° with respect to the strict perpendicular or parallel, and the error with respect to the strict perpendicular or parallel is preferably 5° or less, and more preferably 3° or less.

In the present specification, the terms "same" and "identical" include an error range generally allowed in the technical field. Further, in the present specification, in a case of referring to "all", "any", or "whole surface", the term includes an error range generally allowed in the technical field in addition to a case of 100%, and includes, for example, a case of 99% or more, a case of 95% or more, or a case of 90% or more.

First Embodiment

Figure 1:
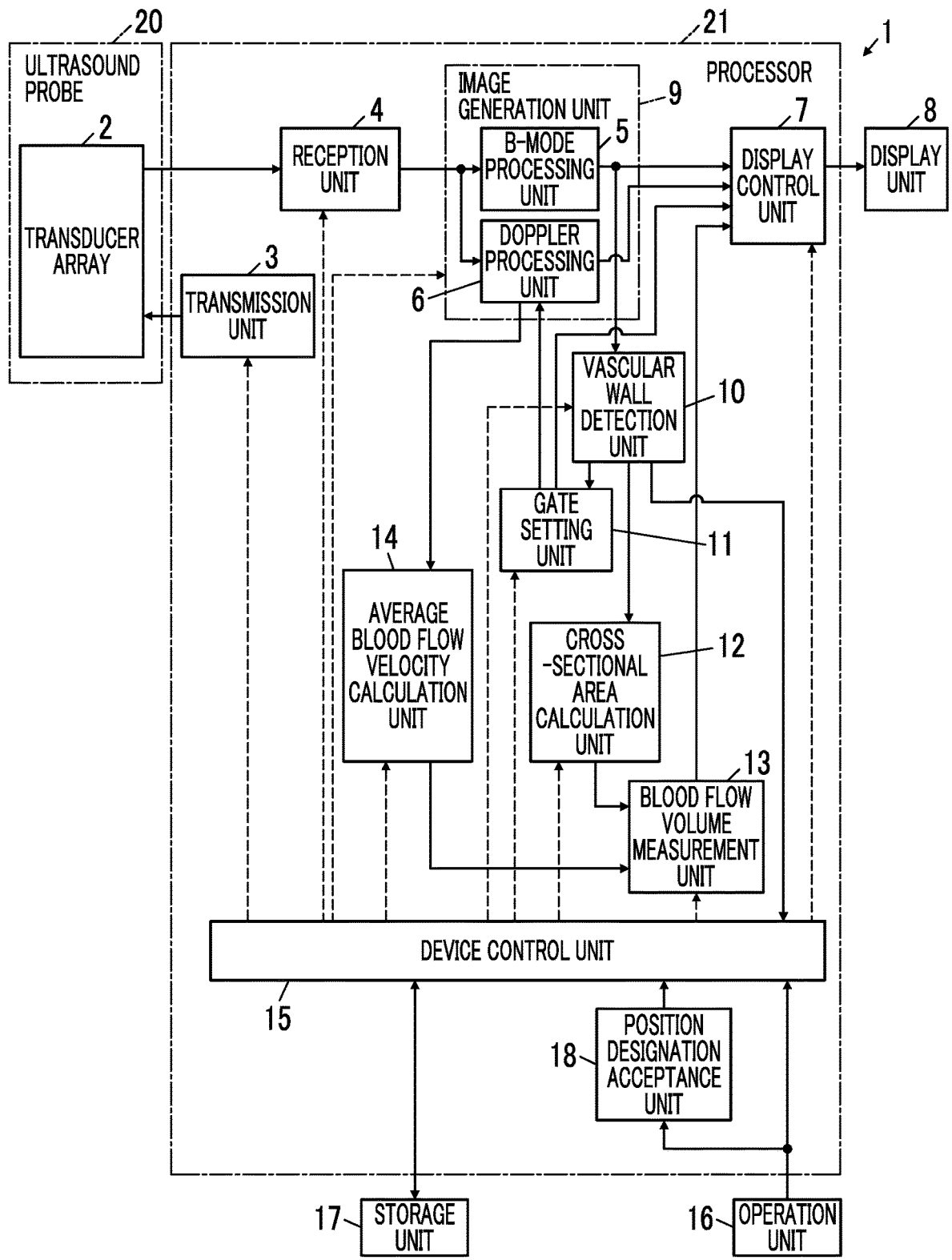
FIG. 1 is a block diagram illustrating a configuration of an ultrasound diagnostic apparatus according to a first embodiment of the invention.

FIG. 1 illustrates a configuration of an ultrasound diagnostic apparatus 1 according to a first embodiment of the invention. As illustrated in FIG. 1, the ultrasound diagnostic apparatus 1 comprises a transducer array 2, and each of a transmission unit 3 and a reception unit 4 is connected to the transducer array 2. A B-mode processing unit 5 and a Doppler processing unit 6 are connected in parallel to the reception unit 4, and a display unit 8 is connected to the B-mode processing unit 5 and the Doppler processing unit 6 via a display control unit 7. The B-mode processing unit 5 and the Doppler processing unit 6 constitute an image generation unit 9.

A vascular wall detection unit 10 is connected to the B-mode processing unit 5, and a gate setting unit 11 and a cross-sectional area calculation unit 12 are connected to the vascular wall detection unit 10. The gate setting unit 11 is connected to the Doppler processing unit 6, and a blood flow volume measurement unit 13 is connected to the cross-sectional area calculation unit 12. In addition, an average blood flow velocity calculation unit 14 is connected to the Doppler processing unit 6, and the blood flow volume measurement unit 13 is connected to the average blood flow velocity calculation unit 14. Further, each of the gate setting unit 11 and the blood flow volume measurement unit 13 is connected to the display control unit.

In addition, a device control unit 15 is connected to the transmission unit 3, the reception unit 4, the display control unit 7, the image generation unit 9, the vascular wall detection unit 10, the gate setting unit 11, the cross-sectional area calculation unit 12, the blood flow volume measurement unit 13, and the average blood flow velocity calculation unit 14, and an operation unit 16 and a storage unit 17 are connected to the device control unit 15. Further, a position designation acceptance unit 18 is connected to the operation unit 16, and the position designation acceptance unit 18 is connected to the device control unit 15. The device control unit 15 and the storage unit 17 are connected so as to exchange information bidirectionally.

Further, the transducer array 2 is included in an ultrasound probe 20, and the transmission unit 3, the reception unit 4, the display control unit 7, the image generation unit 9, the vascular wall detection unit 10, the gate setting unit 11, the cross-sectional area calculation unit 12, the blood flow volume measurement unit 13, the average blood flow velocity calculation unit 14, the device control unit 15, and the position designation acceptance unit 18 constitute a processor 21.

The transducer array 2 of the ultrasound probe 20 illustrated in FIG. 1 has a plurality of transducers arranged in a one-dimensional or two-dimensional manner. According to a drive signal supplied from the transmission unit 3, each of the transducers transmits an ultrasonic wave and receives an ultrasound echo from a subject to output a signal based on the ultrasound echo. For example, each transducer is configured by forming electrodes at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

The transmission unit 3 of the processor 21 includes, for example, a plurality of pulse generators, and the transmission unit 3 adjusts the amount of delay of each drive signal so that ultrasonic waves transmitted from the plurality of transducers of the transducer array 2 form an ultrasound beam on the basis of a transmission delay pattern selected according to the control signal from the device control unit 15, and supplies the obtained signals to the plurality of transducers. Thus, in a case where a pulsed or continuous-wave voltage is applied to the electrodes of the transducers of the transducer array 2, the piezoelectric body expands and contracts to generate pulsed or continuous-wave ultrasonic waves from each transducer. From the combined wave of these ultrasonic waves, an ultrasound beam is formed.

The transmitted ultrasound beam is reflected by a target, for example, a site of the subject, and propagates toward the transducer array 2 of the ultrasound probe 20. The ultrasonic waves propagating toward the transducer array 2 in this manner are received by each transducer constituting the transducer array 2. In this case, each transducer constituting the transducer array 2 expands and contracts by receiving the propagating ultrasound echo to generate electrical signals, and outputs the electrical signals to the reception unit 4.

Figure 2:
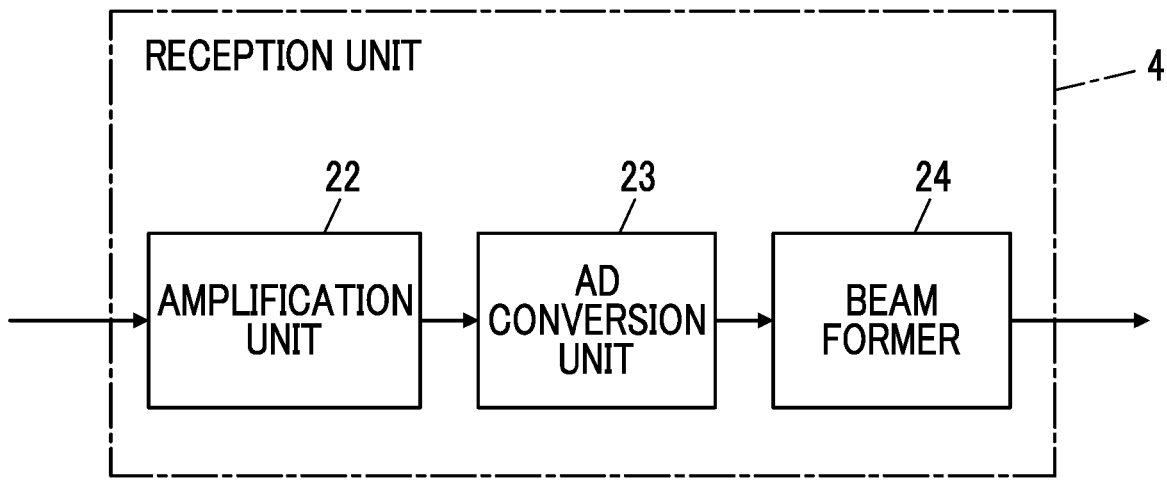
FIG. 2 is a block diagram illustrating an internal configuration of a reception unit in the first embodiment of the invention.

The reception unit 4 of the processor 21 processes the signals output from the transducer array 2 according to the control signals from the device control unit 15. As illustrated in FIG. 2, the reception unit 4 has a configuration in which an amplification unit 22, an analog digital (AD) conversion unit 23, and a beam former 24 are connected in series.

The amplification unit 22 amplifies the signals input from each transducer constituting the transducer array 2, and transmits the amplified signals to the AD conversion unit 23. The AD conversion unit 23 converts the signals transmitted from the amplification unit 22 into digital data, and transmits the data to the beam former 24. The beam former 24 performs so-called reception focusing processing in which addition is performed by giving delays to respective pieces of data converted by the AD conversion unit 23 according to a sound speed distribution or a sound speed set on the basis of a reception delay pattern selected according to the control signals from the device control unit 15. Through the reception focusing processing, a reception signal in which each piece of data converted by the AD conversion unit 23 is phased and added and the focus of the ultrasound echo is narrowed is acquired.

Figure 3:
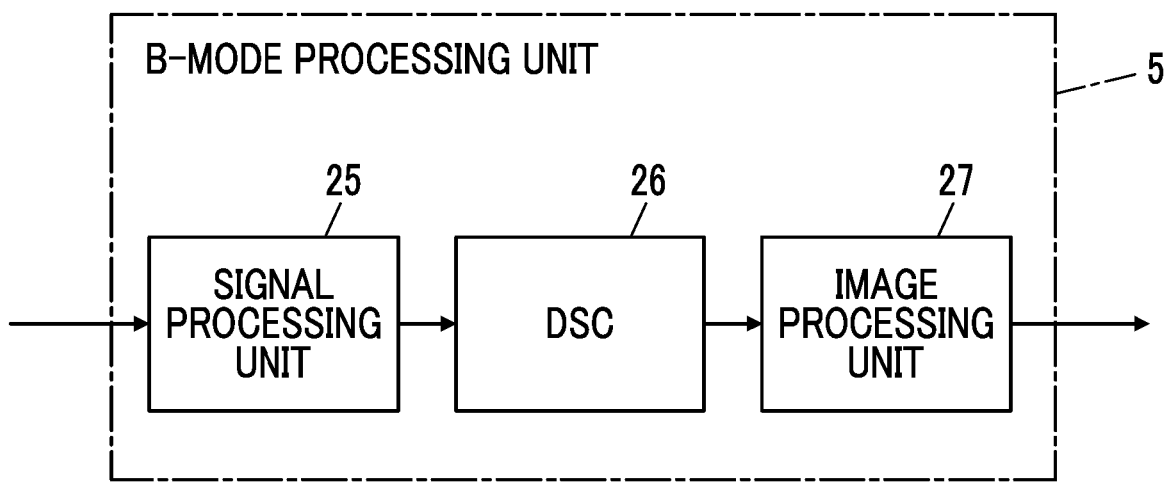
FIG. 3 is a block diagram illustrating an internal configuration of a B-mode processing unit in the first embodiment of the invention.

As illustrated in FIG. 3, the B-mode processing unit 5 of the image generation unit 9 has a configuration in which a signal processing unit 25, a digital scan converter (DSC) 26, and an image processing unit 27 are sequentially connected in series.

The signal processing unit 25 generates a B-mode image signal, which is tomographic image information regarding tissues inside the subject, by performing, on reception data generated by the reception unit 4, correction of the attenuation due to the distance according to the depth of the reflection position of the ultrasonic wave and then performing envelope detection processing.

The DSC 26 converts (raster conversion) the B-mode image signal generated by the signal processing unit 25 into an image signal according to a normal television signal scanning method.

The image processing unit 27 performs various kinds of necessary image processing such as gradation processing on the B-mode image signal input from the DSC 26, and then outputs the B-mode image signal to the display control unit 7.

Figure 4:
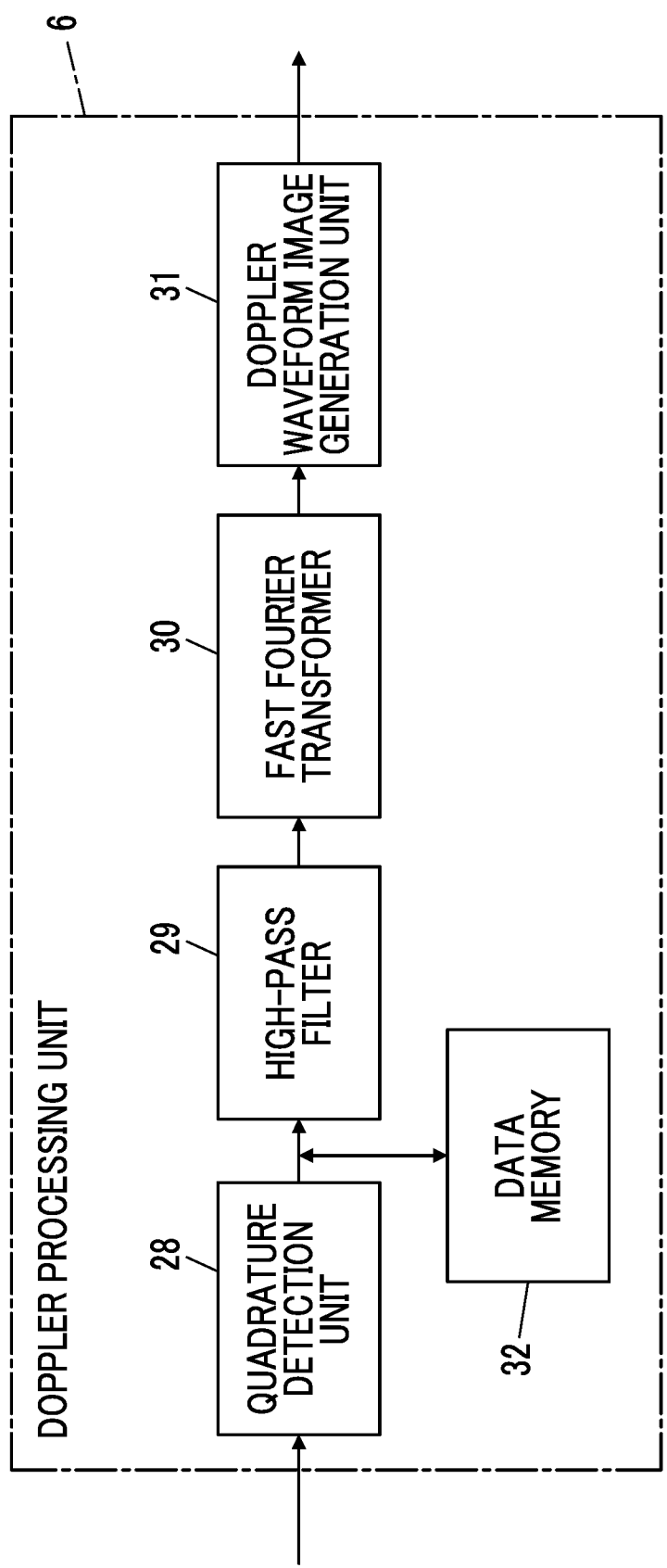
FIG. 4 is a block diagram illustrating an internal configuration of a Doppler processing unit in the first embodiment of the invention.

The Doppler processing unit 6 of the image generation unit 9 calculates the blood flow velocity using a so-called pulse Doppler method and generates a Doppler waveform image. As illustrated in FIG. 4, the Doppler processing unit 6 has a configuration in which a quadrature detection unit 28, a high-pass filter 29, a fast Fourier transformer 30, and a Doppler waveform image generation unit 31 are sequentially connected in series and a data memory 32 is connected to an output terminal of the quadrature detection unit 28.

The quadrature detection unit 28 mixes the reception data generated by the reception unit 4 with a carrier signal having a reference frequency to perform quadrature detection on the reception data and converts the reception data into complex data.

The high-pass filter 29 functions as a so-called wall filter, and removes a frequency component derived from the motion of the body tissue inside the subject, from the complex data generated by the quadrature detection unit 28.

The fast Fourier transformer 30 performs a Fourier transform on the complex data of a plurality of sample points to perform frequency analysis, obtains the blood flow velocity, and generates a spectrum signal.

The Doppler waveform image generation unit 31 generates a Doppler waveform image by aligning the spectrum signals generated by the fast Fourier transformer 30 on a time axis and expressing the magnitude of each frequency component in brightness. In the Doppler waveform image, the lateral axis indicates a time axis, the vertical axis indicates a Doppler shift frequency, that is, a flow velocity, and the brightness of the waveform represents power in each frequency component.

Further, the data memory 32 preserves the complex data converted from the reception data by the quadrature detection unit 28.

The device control unit 15 of the processor 21 controls each unit of the ultrasound diagnostic apparatus 1 on the basis of a program stored in advance in the storage unit 17 or the like and a user's operation through the operation unit 16.

The display control unit 7 of the processor 21 performs predetermined processing on the B-mode image signal generated by the image generation unit 9 and generates an image displayable on the display unit 8, under the control of the device control unit 15.

The display unit 8 of the ultrasound diagnostic apparatus 1 displays the image generated by the display control unit 7, and includes, for example, a display device such as a liquid crystal display (LCD).

The operation unit 16 of the ultrasound diagnostic apparatus 1 is for the user to perform an input operation, and can be configured to comprise a keyboard, a mouse, a trackball, a touchpad, a touch panel, and the like.

The position designation acceptance unit 18 of the processor 21 accepts a position designation of a blood vessel region by the user through the operation unit 16, on the B-mode image displayed on the display unit 8. For example, in a case where the operation unit 16 is configured by the touch panel, the position designation acceptance unit 18 can accept the position designation of the blood vessel region which is touched by the user's finger, a stylus pen, or the like.

Figure 5:
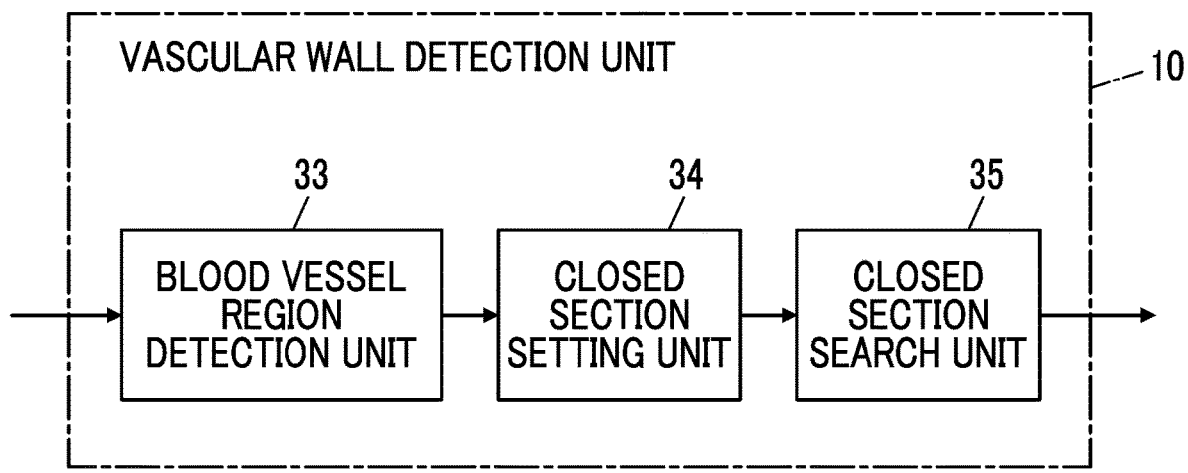
FIG. 5 is a block diagram illustrating an internal configuration of a vascular wall detection unit in the first embodiment of the invention.

The vascular wall detection unit 10 of the processor 21 detects an anterior vascular wall and a posterior vascular wall by performing the image analysis on the B-mode image, on the basis of the position designation of the blood vessel region by the user which is accepted by the position designation acceptance unit 18. As illustrated in FIG. 5, the vascular wall detection unit 10 has a configuration in which a blood vessel region detection unit 33, a closed section setting unit 34, and a closed section search unit 35 are connected in series.

Figure 6:
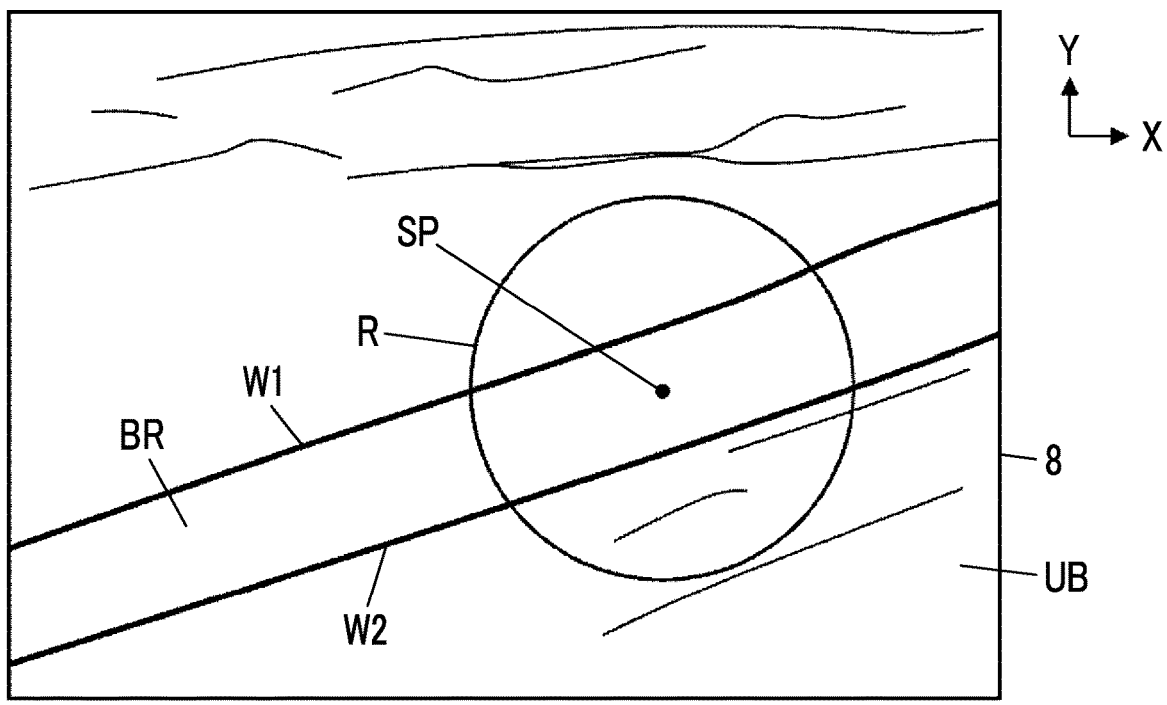
FIG. 6 is a diagram schematically illustrating a designation point designated by a user in the first embodiment of the invention.

Here, an upper vascular wall of the vascular walls on the B-mode image, that is, a vascular wall on a shallow portion side which is close to the body surface of the subject with which the ultrasound probe 20 is in contact is called the anterior vascular wall, and a lower vascular wall of the vascular walls on the B-mode image, that is, a vascular wall on a deep portion side which is far from the body surface with which the ultrasound probe 20 is in contact with is called the posterior vascular wall. For example, for convenience, as illustrated in FIG. 6, in the screen of the display unit 8, in a case where a direction extending horizontally is set as an X direction and a direction extending vertically is set as a Y direction, of the vascular walls as the boundary of a blood vessel region BR on a B-mode image UB, an anterior vascular wall W1 is positioned on the upper side, that is, +Y direction side, and a posterior vascular wall W2 is positioned on the lower side, that is, −Y direction side.

The blood vessel region detection unit 33 of the vascular wall detection unit 10 performs the image analysis on the B-mode image UB generated by the B-mode processing unit 5 to detect the blood vessel region on the B-mode image UB. In this case, the blood vessel region detection unit 33 can detect the blood vessel region on the B-mode image UB using a known algorithm. For example, the blood vessel region detection unit 33 can store typical pattern data of the blood vessel region in advance as a template, calculate a similarity for the pattern data while searching the image using the template, and consider that the blood vessel region is present in a place where the similarity is equal to or greater than a threshold value and is the maximum.

For the calculation of the similarity, in addition to simple template matching, for example, a machine learning method described in Csurka et al.: Visual Categorization with Bags of Keypoints, Proc. of ECCV Workshop on Statistical Learning in Computer Vision, pp. 59-74 (2004) or a general image recognition method using deep learning described in Krizhevsk et al.: ImageNet Classification with Deep Convolutional Neural Networks, Advances in Neural Information Processing Systems 25, pp. 1106-1114 (2012) can be used.

The closed section setting unit 34 of the vascular wall detection unit 10 sets a closed section which includes the position designated by the user via the position designation acceptance unit 18 and of which the blood vessel region detected by the blood vessel region detection unit 33 passes through the inside. For example, as illustrated in FIG. 6, the closed section setting unit 34 can set a circular closed section R centered on a designation position SP designated by the user through the operation unit 16, on the B-mode image UB. In the example illustrated in FIG. 6, the blood vessel region BR passes through the inside of the closed section R. The closed section set by the closed section setting unit 34 is not limited to a circular shape illustrated in FIG. 6 as long as the closed section has a closed shape, and can have any shape.

Figure 7:
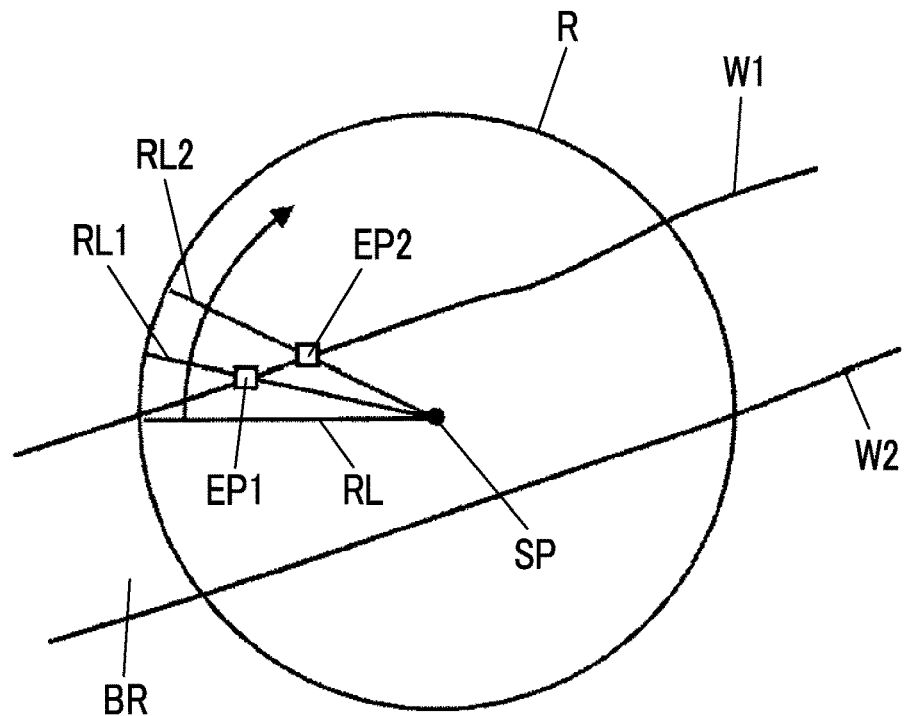
FIG. 7 is a diagram schematically illustrating a method of detecting a vascular wall by the vascular wall detection unit in the first embodiment of the invention.

The closed section search unit 35 of the vascular wall detection unit 10 searches the inside of the closed section set by the closed section setting unit 34 to detect the anterior vascular wall W1 and the posterior vascular wall W2. In this case, for example, the closed section search unit 35 can search the inside of the closed section R using a method as disclosed in JP4749592B, and detect the anterior vascular wall W1 and the posterior vascular wall W2. Specifically, as illustrated in FIG. 7, the closed section search unit 35 searches for the B-mode intensity data outwards from the designation position SP along a search line RL connecting the designation position SP and the boundary of the closed section R, over an entire 360° range of the designation position SP designated by the user through the operation unit 16, to detect a position where the amount of change in B-mode intensity is maximum, as the anterior vascular wall W1 or the posterior vascular wall W2. Here, as the B-mode intensity data, for example, a brightness value of the B-mode image signal can be used.

The example illustrated in FIG. 7 indicates a form in which the anterior vascular wall W1 and the posterior vascular wall W2 are searched for while the search line RL connecting the designation position SP and the boundary of the closed section R is scanned by a predetermined angle clockwise over 360° around the designation position SP, and an edge point EP1 corresponding to the anterior vascular wall W1 on a search line RL1 is detected, and an edge point EP2 corresponding to the anterior vascular wall W1 on a search line RL2 is detected.

Figure 8:
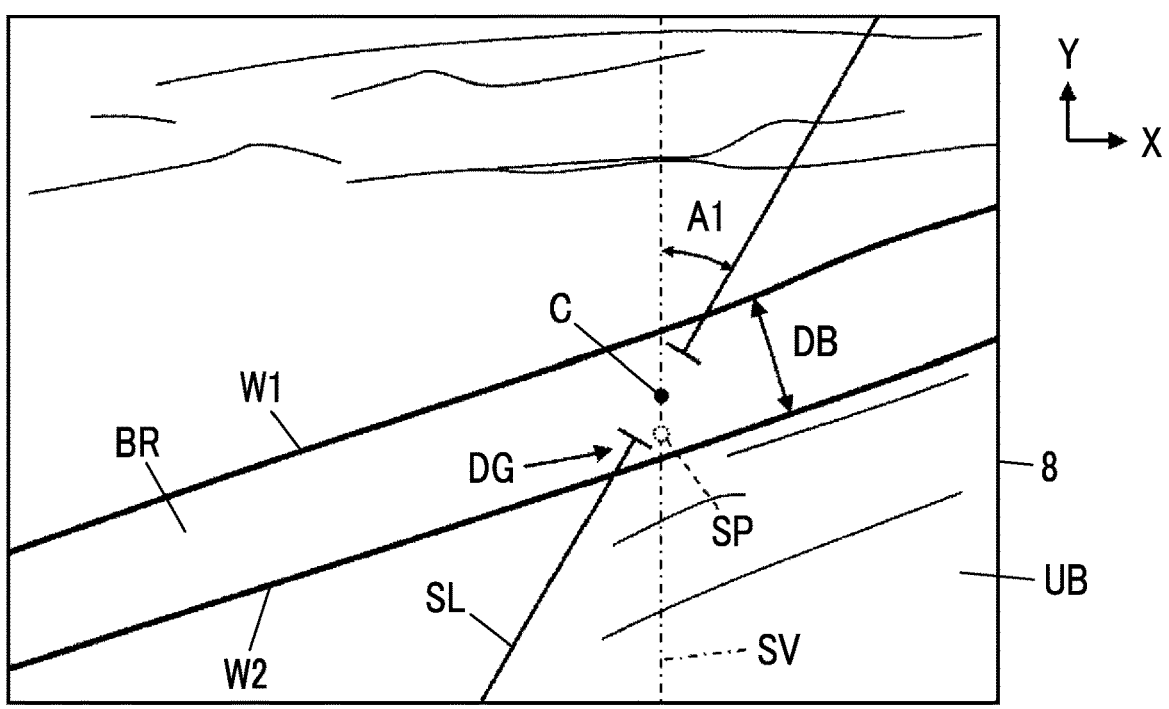
FIG. 8 is a diagram schematically illustrating a Doppler gate in the first embodiment of the invention.

The gate setting unit 11 of the processor 21 sets a Doppler gate in the blood vessel region BR on the B-mode image on the basis of the anterior vascular wall W1 and the posterior vascular wall W2 detected by the vascular wall detection unit 10. In this case, the gate setting unit 11 can set the Doppler gate using a method disclosed in JP4749592B, for example. More specifically, as illustrated in FIG. 8, the gate setting unit 11 can detect a center position C of the blood vessel region BR on a vertical line SV passing through the designation position SP on the basis of the detected anterior vascular wall W1 and posterior vascular wall W2, and set a Doppler gate DG such that the center position C and the center of the Doppler gate DG overlap each other. In this case, for example, although not illustrated, the gate setting unit 11 can calculate a line segment substantially perpendicular to the anterior vascular wall W1 and the posterior vascular wall W2, and detect an intersection between the line segment and the vertical line SV as the center position C. Here, the vertical line SV is a virtual line extending along a vertical direction with respect to the display unit 8, that is, the Y direction.

Further, the gate setting unit 11 can calculate a blood vessel diameter DB on the basis of the detected positions of the anterior vascular wall W1 and the posterior vascular wall W2, and adjust the size of the Doppler gate DG on the basis of the calculated blood vessel diameter DB. Here, the Doppler gate DG set by the gate setting unit 11 is inclined from the vertical line SV on the screen of the display unit 8 by a cursor steering angle A1, and the cursor steering angle A1 is equal to an inclination angle of a scan line SL passing through the center position C of the Doppler gate DG.

The cross-sectional area calculation unit 12 of the processor 21 calculates the blood vessel diameter DB from the positions of the anterior vascular wall W1 and the posterior vascular wall W2 detected by the vascular wall detection unit 10, and calculates a cross-sectional area of the blood vessel from the blood vessel diameter DB assuming that the blood vessel has a circular cross section.

The average blood flow velocity calculation unit 14 of the processor 21 calculates an average blood flow velocity for one heartbeat period on the basis of the blood flow velocity calculated by the Doppler processing unit 6.

The blood flow volume measurement unit 13 of the processor 21 measures a blood flow volume representing the volume of the blood flowing in the blood vessel per unit time on the basis of the cross-sectional area of the blood vessel calculated by the cross-sectional area calculation unit 12 and the average blood flow velocity calculated by the average blood flow velocity calculation unit 14.

Information on the Doppler gate DG set by the gate setting unit 11 and the blood flow volume measured by the blood flow volume measurement unit 13 is sent to the display unit 8 via the display control unit 7 and is displayed on the display unit 8.

The storage unit 17 stores an operation program and the like of the ultrasound diagnostic apparatus 1, and recording media such as a hard disc drive (HDD), a solid state drive (SSD), a flexible disc (FD), a magneto-optical disc (MO disc), a magnetic tape (MT), a random access memory (RAM), a compact disc (CD), a digital versatile disc (DVD), a secure digital card (SD card), and a universal serial bus memory (USB memory), or a server can be used.

The processor 21 having the transmission unit 3, the reception unit 4, the display control unit 7, the image generation unit 9, the vascular wall detection unit 10, the gate setting unit 11, the cross-sectional area calculation unit 12, the blood flow volume measurement unit 13, the average blood flow velocity calculation unit 14, the device control unit 15, and the position designation acceptance unit 18 is configured by a central processing unit (CPU) and a control program causing the CPU to execute various kinds of processing, but may be configured using a digital circuit. In addition, the processor 21 having the transmission unit 3, the reception unit 4, the display control unit 7, the image generation unit 9, the vascular wall detection unit 10, the gate setting unit 11, the cross-sectional area calculation unit 12, the blood flow volume measurement unit 13, the average blood flow velocity calculation unit 14, the device control unit 15, and the position designation acceptance unit 18 can also be configured by being integrated partially or entirely into one CPU.

Figure 9:
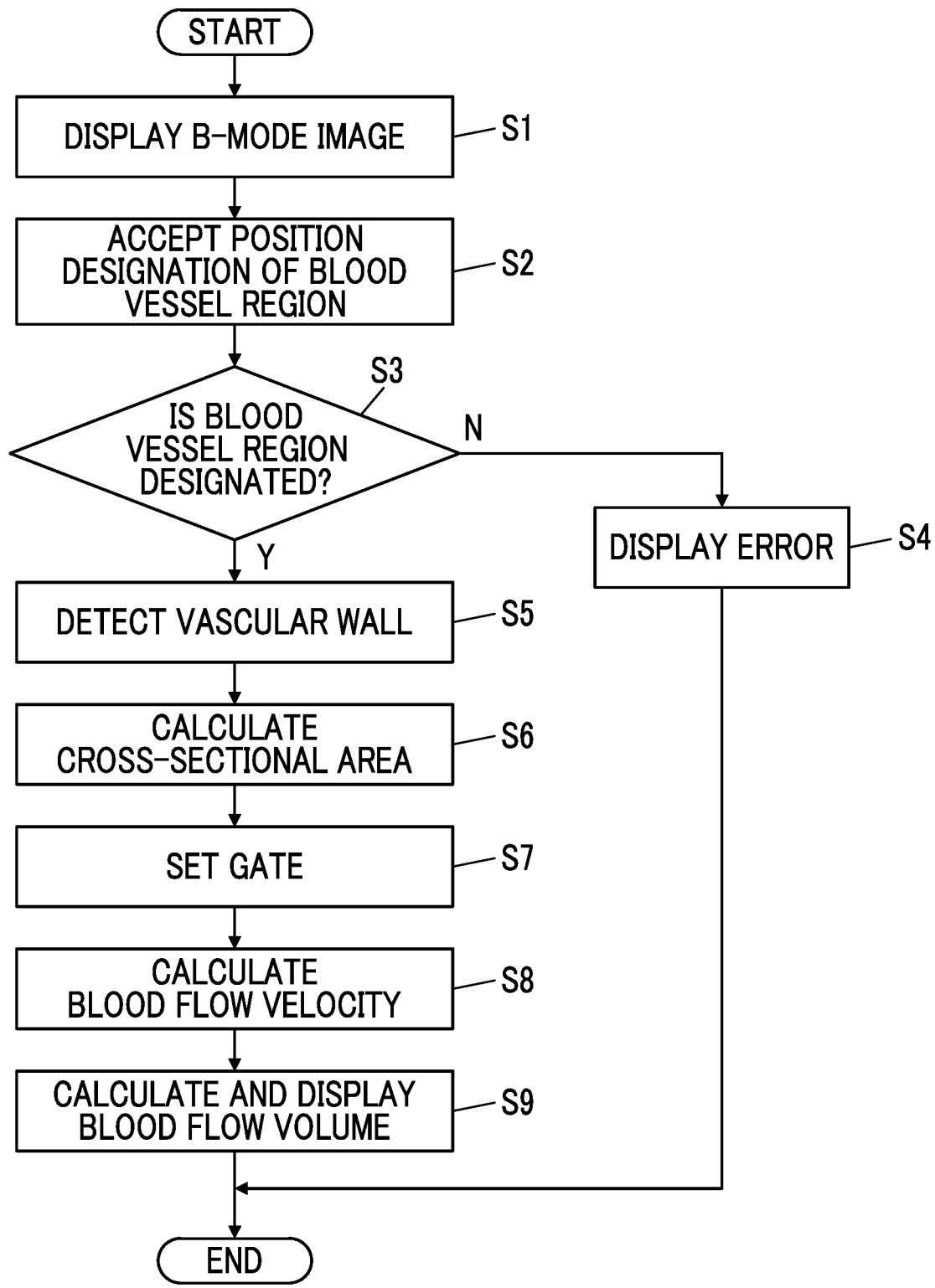
FIG. 9 is a flowchart illustrating an operation of the ultrasound diagnostic apparatus according to the first embodiment of the invention.

Next, the operation of the ultrasound diagnostic apparatus 1 in the first embodiment will be described in detail using the flowchart illustrated in FIG. 9.

First, in Step S1, the B-mode image UB in which at least the blood vessel region BR is imaged is acquired, and is displayed on the display unit 8. In this case, an ultrasound beam is transmitted from the plurality of transducers of the transducer array 2 according to the drive signal from the transmission unit 3, the reception signal is output to the reception unit 4 from each transducer which has received the ultrasound echo from the subject, is amplified in the amplification unit 22, is subjected to the AD conversion in the AD conversion unit 23, and is phased and added in the beam former 24, and thereby the reception data is generated. The reception data is subjected to the envelope detection processing by the signal processing unit 25 of the B-mode processing unit 5 to become the B-mode image signal, and is output to the display control unit 7 via the DSC 26 and the image processing unit 27, and the B-mode image UB is displayed on the display unit 8 by the display control unit 7.

In subsequent Step S2, the blood vessel region detection unit 33 of the vascular wall detection unit 10 performs the image analysis on the B-mode image UB displayed on the display unit 8 in Step S1 to detect the blood vessel region BR on the B-mode image UB. After the blood vessel region BR is detected in this manner, the designation position SP on the B-mode image UB is designated by the user through the operation unit 16, and the designation position SP is accepted by the position designation acceptance unit 18.

In Step S3, the device control unit 15 determines whether the designation position SP accepted by the position designation acceptance unit 18 in Step S2 is a position within the blood vessel region BR. In a case where the designation position SP accepted in Step S2 is a position outside the blood vessel region BR, the processing proceeds to Step S4, an error is displayed on the display unit 8, and the operation of the ultrasound diagnostic apparatus 1 is ended.

Figure 10:
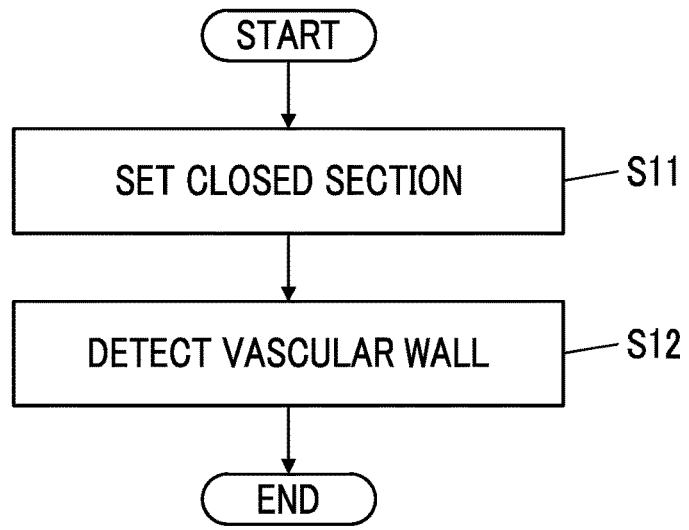
FIG. 10 is a flowchart illustrating a vascular wall detection operation in the first embodiment of the invention.

In a case where it is determined in Step S3 that the designation position SP accepted in Step S2 is a position within the blood vessel region BR, the processing proceeds to Step S5. In Step S5, the vascular wall detection unit 10 performs the image analysis on the B-mode image UB displayed on the display unit 8 in Step S1 to detect the anterior vascular wall W1 and the posterior vascular wall W2 on the B-mode image UB. In this case, the vascular wall detection unit 10 performs processing illustrated in the flowchart of FIG. 10 to detect the anterior vascular wall W1 and the posterior vascular wall W2.

First, in Step S11, as illustrated in FIG. 6, the closed section setting unit 34 of the vascular wall detection unit 10 sets the closed section R which includes the designation position SP accepted in Step S2 and of which the blood vessel region BR passes through the inside.

Next, in Step S12, as illustrated in FIG. 7, the closed section search unit 35 of the vascular wall detection unit 10 searches the inside of the closed section R set in Step S11, to detect the anterior vascular wall W1 and the posterior vascular wall W2. For example, the closed section search unit 35 performs the search outwards on the search line RL connecting the designation position SP and the boundary of the closed section R while rotating the search line RL by a predetermined angle over 360°, and detects edge points of the anterior vascular wall W1 and the posterior vascular wall W2 where the amount of change in B-mode intensity on the search line RL is a maximum value, to detect the anterior vascular wall W1 and the posterior vascular wall W2. In this manner, the processing of Step S5 is performed by the vascular wall detection unit 10.

In subsequent Step S6, as illustrated in FIG. 8, the cross-sectional area calculation unit 12 calculates the blood vessel diameter DB on the basis of the positions of the anterior vascular wall W1 and the posterior vascular wall W2 detected in Step S5, and calculates the cross-sectional area of the blood vessel from the blood vessel diameter DB assuming that the blood vessel has a circular cross section.

In a case where the cross-sectional area of the blood vessel is calculated in this manner, in Step S7, the gate setting unit 11 sets the Doppler gate DG on the B-mode image UB as illustrated in FIG. 8. In this case, the gate setting unit 11 can set the Doppler gate DG on the B-mode image UB using a method disclosed in JP4749592B, for example.

In subsequent Step S8, the information on the Doppler gate DG set in Step S7 is output from the gate setting unit 11 to the Doppler processing unit 6 of the image generation unit 9, and the Doppler processing unit 6 calculates the blood flow velocity on the basis of the Doppler data in the region interposed in the Doppler gate DG, and generates the Doppler waveform image. In this manner, in a case where the blood flow velocity is calculated by the Doppler processing unit 6, the average blood flow velocity calculation unit 14 calculates the average blood flow velocity for one heartbeat period on the basis of the calculated blood flow velocity.

In Step S9, the blood flow volume measurement unit 13 measures the blood flow volume representing the volume of the blood flowing in the blood vessel per unit time on the basis of the cross-sectional area of the blood vessel calculated in Step S6 and the average blood flow velocity for one heartbeat period calculated in Step S8, and displays the measurement result on the display unit 8.

Specifically, in a case of measuring the blood flow volume, in a case where the cross-sectional area of the blood vessel is set as CSA ($cm^2$) and the average blood flow velocity is set as MNV (m/s), the blood flow volume measurement unit 13 can calculate a blood flow volume VF (ml/min) using following Equation (1).

$$VF = CSA \times MNV \times 60 \text{ (s/min)} \times 100 \text{ (cm/m)} \qquad (1)$$

Figure 11:
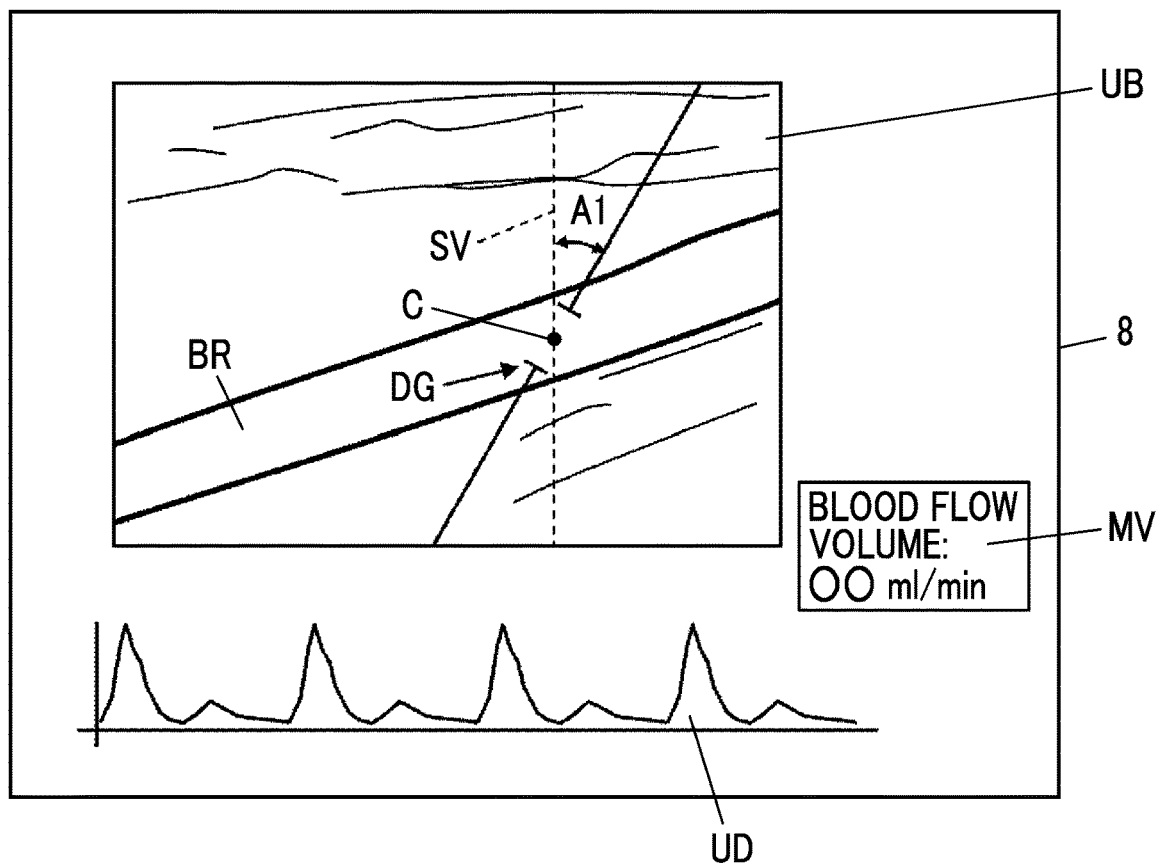
FIG. 11 is a diagram schematically illustrating a display example of a B-mode image and a Doppler image in the first embodiment of the invention.

Further, in a case of displaying the measurement result on the display unit 8, the blood flow volume measurement unit 13 can display the measurement result as illustrated in FIG. 11, for example. In the example illustrated in FIG. 11, a Doppler waveform image UD generated in Step S8 and a measurement value MV of the blood flow volume are displayed to be aligned with the B-mode image UB. With such a display, it is possible for the user to check the blood flow volume measured by the blood flow volume measurement unit 13 while observing the B-mode image UB and the Doppler waveform image UD displayed on the display unit 8.

Thereby, the operation of the ultrasound diagnostic apparatus 1 is ended.

As described above, with the ultrasound diagnostic apparatus 1 according to the first embodiment of the invention, in a case where the position of the blood vessel region BR on the B-mode image UB displayed on the display unit 8 is designated by the user through the operation unit 16, the measurement result of the blood flow volume is automatically displayed on the display unit 8, and therefore, it is possible to easily measure the blood flow volume in a short time.

In a case where the user designates the position of the blood vessel region BR through the operation unit 16, the blood vessel region BR can be displayed on the display unit 8. For example, the blood vessel region detection unit 33 can display the blood vessel region BR on the display unit 8 by assigning any color to the blood vessel region BR, surrounding the blood vessel region BR with a line such as a solid line or a broken line, and the like on the B-mode image UB displayed on the display unit 8. Thereby, it is possible for the user to more easily grasp the blood vessel region BR on the B-mode image UB displayed on the display unit 8.

In the first embodiment, the blood vessel region detection unit 33 of the vascular wall detection unit 10 detects the blood vessel region BR in advance before the designation position SP on the B-mode image UB is designated by the user through the operation unit 16, but can also detect the blood vessel region BR by using the designation of the designation position SP on the B-mode image UB by the user as a trigger. In this case, the blood vessel region BR can be detected by the closed section setting unit 34 of the vascular wall detection unit 10 setting the closed section R including the designation position SP and the blood vessel region detection unit 33 performing the image analysis on the B-mode image UB within the closed section R. In a case where the blood vessel region BR cannot be detected within the closed section R, an error is displayed on the display unit 8. Further, the blood vessel region detection unit 33 may detect the blood vessel region BR by performing the image analysis over the entire B-mode image UB without the setting of the closed section R.

In the first embodiment, the closed section search unit 35 detects the anterior vascular wall W1 and the posterior vascular wall W2 by detecting the edge point within the closed section R, but can also detect the contour of the blood vessel region BR positioned in a shallow portion direction as the anterior vascular wall W1 and the contour of the blood vessel region BR positioned in a deep portion direction as the posterior vascular wall W2, of the contour of the blood vessel region BR within the closed section R.

In the first embodiment, an example has been described in which the Doppler waveform image UD, the measurement value MV of the blood flow volume, and the B-mode image UB are displayed on the display unit 8 as illustrated in FIG. 11, but a method of displaying the measurement result is not limited thereto. For example, it is possible to separately display the Doppler waveform image UD, the B-mode image UB, and the measurement value MV of the blood flow volume by switching the display in which the Doppler waveform image UD and the B-mode image UB are aligned and the display of the measurement value MV of the blood flow volume on the display unit 8. For example, although not illustrated, by providing a display screen different from the display unit 8 to the ultrasound diagnostic apparatus 1, the B-mode image UB can be displayed on any one of the display screen or the display unit 8, and the Doppler waveform image UD and the measurement value MV of the blood flow volume can be displayed on the other of the display screen or the display unit 8.

Second Embodiment

The anterior vascular wall W1 and the posterior vascular wall W2 are detected by performing the image analysis on the B-mode image UB as with the method disclosed in JP4749592B in the first embodiment of the invention, but the anterior vascular wall W1 and the posterior vascular wall W2 can be detected using a blood vessel gradient. An ultrasound diagnostic apparatus according to the second embodiment of the invention has the same apparatus configuration as the ultrasound diagnostic apparatus 1 illustrated in FIG. 1 except that the ultrasound diagnostic apparatus according to the second embodiment comprises a vascular wall detection unit 10A instead of the vascular wall detection unit 10 in the first embodiment illustrated in FIG. 1.

Figure 12:
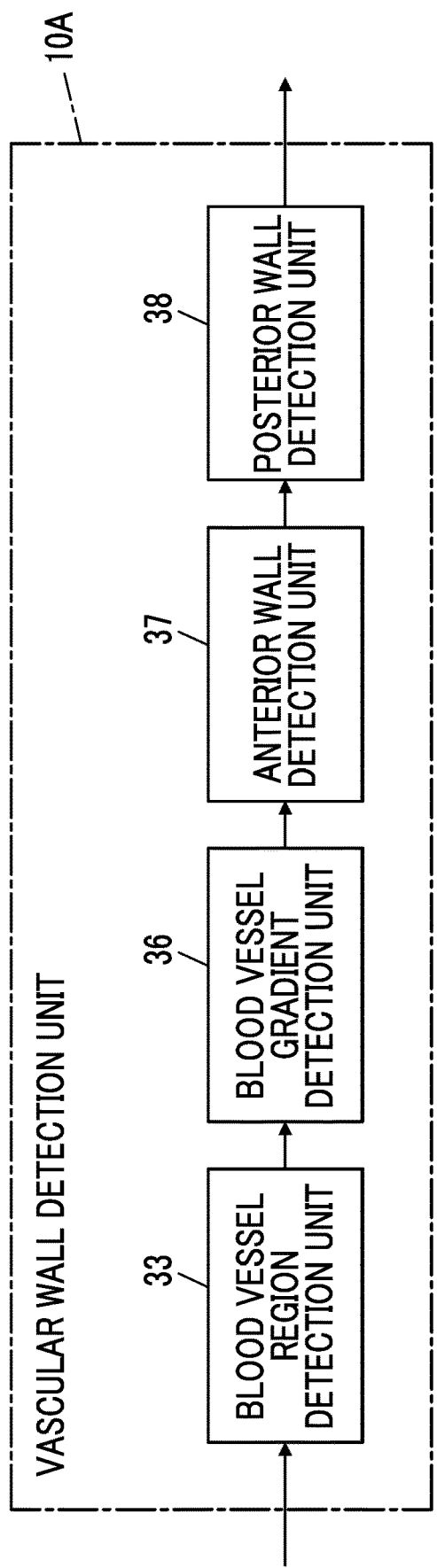
FIG. 12 is a block diagram illustrating an internal configuration of a vascular wall detection unit in a second embodiment of the invention.

As illustrated in FIG. 12, the vascular wall detection unit 10A of the second embodiment of the invention has a configuration in which the blood vessel region detection unit 33, a blood vessel gradient detection unit 36, an anterior wall detection unit 37, and a posterior wall detection unit 38 are connected in series. The blood vessel region detection unit 33 is the same as the blood vessel region detection unit 33 in the first embodiment illustrated in FIG. 5.

Figure 13:
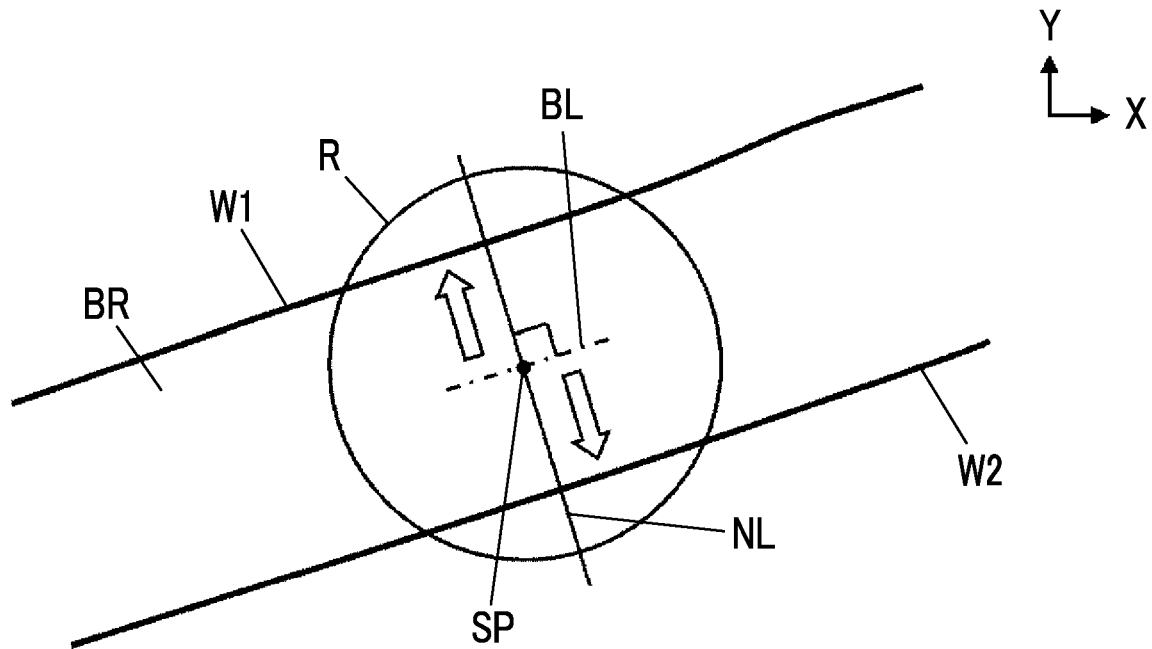
FIG. 13 is a diagram schematically illustrating a method of detecting a vascular wall by the vascular wall detection unit in the second embodiment of the invention.

The blood vessel gradient detection unit 36 of the vascular wall detection unit 10A detects a blood vessel gradient that is a traveling direction of the blood vessel, within a predetermined range including the designation position SP designated by the user through the operation unit 16, on the basis of the blood vessel region BR detected by the blood vessel region detection unit 33. For example, the blood vessel gradient detection unit 36 performs the image analysis on the blood vessel region BR on the B-mode image UB within the closed section including the designation position SP designated by the user, to detect a blood vessel gradient line BL representing the blood vessel gradient, as illustrated in FIG. 13. In this case, for example, the blood vessel gradient detection unit 36 can detect the principal axis of inertia of the blood vessel region BR as the blood vessel gradient line BL.

As illustrated in FIG. 13, the anterior wall detection unit 37 of the vascular wall detection unit 10A detects the anterior vascular wall W1 by performing the image analysis in the shallow portion direction from the designation position SP along a gradient perpendicular line NL perpendicular to the blood vessel gradient line BL detected by the blood vessel gradient detection unit 36. For example, in this case, the anterior wall detection unit 37 detects, as the anterior vascular wall W1, a location where the amount of change in B-mode intensity is the maximum value, in a range having a predetermined length from the designation position SP in the shallow portion direction along the gradient perpendicular line NL.

As illustrated in FIG. 13, as with the anterior wall detection unit 37, the posterior wall detection unit 38 of the vascular wall detection unit 10A detects the posterior vascular wall W2 by performing the image analysis in the deep portion direction from the designation position SP along the gradient perpendicular line NL perpendicular to the blood vessel gradient line BL detected by the blood vessel gradient detection unit 36. For example, in this case, the posterior wall detection unit 38 detects, as the posterior vascular wall W2, a location where the amount of change in B-mode intensity is the maximum value, in a range having a predetermined length from the designation position SP in the deep portion direction along the gradient perpendicular line NL.

Figure 14:
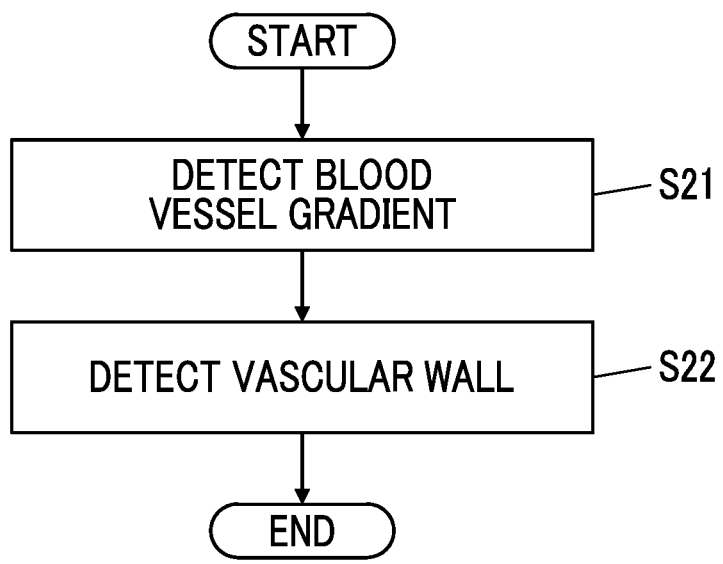
FIG. 14 is a flowchart illustrating a vascular wall detection operation in the second embodiment of the invention.

Next, a vascular wall detection operation in the second embodiment will be described using the flowchart illustrated in FIG. 14.

First, in Step S21, the blood vessel gradient detection unit 36 of the vascular wall detection unit 10A detects the blood vessel gradient by performing the image analysis on the blood vessel region BR on the B-mode image UB within the closed section including the designation position SP designated by the user. For example, as illustrated in FIG. 13, the blood vessel gradient detection unit 36 can detect the principal axis of inertia of the blood vessel region BR within the closed section R as the blood vessel gradient line BL representing the blood vessel gradient.

In subsequent Step S22, the anterior vascular wall W1 is detected by the anterior wall detection unit 37 of the vascular wall detection unit 10A on the basis of the blood vessel gradient detected in Step S21, and the posterior vascular wall W2 is detected by the posterior wall detection unit 38 on the basis of the blood vessel gradient detected in Step S21. In this case, for example, as illustrated in FIG. 13, the anterior wall detection unit 37 detects, as the anterior vascular wall W1, a location where the amount of change in B-mode intensity is the maximum value, in a range having a predetermined length from the designation position SP, which is designated by the user through the operation unit 16, in the shallow portion direction along the gradient perpendicular line NL perpendicular to the blood vessel gradient line BL detected in Step S22. Further, as with the processing performed by the anterior wall detection unit 37, the posterior wall detection unit 38 detects, as the posterior vascular wall W2, a location where the amount of change in B-mode intensity is the maximum value, in a range having a predetermined length from the designation position SP in the deep portion direction along the gradient perpendicular line NL. In this manner, the anterior vascular wall W1 and the posterior vascular wall W2 can be detected in a more limited range along the gradient perpendicular line NL.

Thereby, the vascular wall detection operation in the second embodiment of the invention is ended.

As described above, with the ultrasound diagnostic apparatus of the second embodiment of the invention, since the blood vessel gradient line BL representing the blood vessel gradient is detected by performing the image analysis on the B-mode image UB and the anterior vascular wall W1 and the posterior vascular wall W2 are detected along the gradient perpendicular line NL perpendicular to the blood vessel gradient line BL, it is possible to more limit the range used in detecting the anterior vascular wall W1 and the posterior vascular wall W2, and to reduce a calculation load of the ultrasound diagnostic apparatus. Thereby, it is possible to detect the anterior vascular wall W1 and the posterior vascular wall W2 in a shorter time.

In the second embodiment, in a case of detecting the anterior vascular wall W1 and the posterior vascular wall W2, the setting of the closed section R as illustrated in FIG. 6 is not performed, but the anterior wall detection unit 37 and the posterior wall detection unit 38 can detect the anterior vascular wall W1 and the posterior vascular wall W2 by setting the closed section R and performing the search on the gradient perpendicular line NL while moving the gradient perpendicular line NL in a direction parallel to the blood vessel gradient line BL within the closed section R.

Third Embodiment

Figure 15:
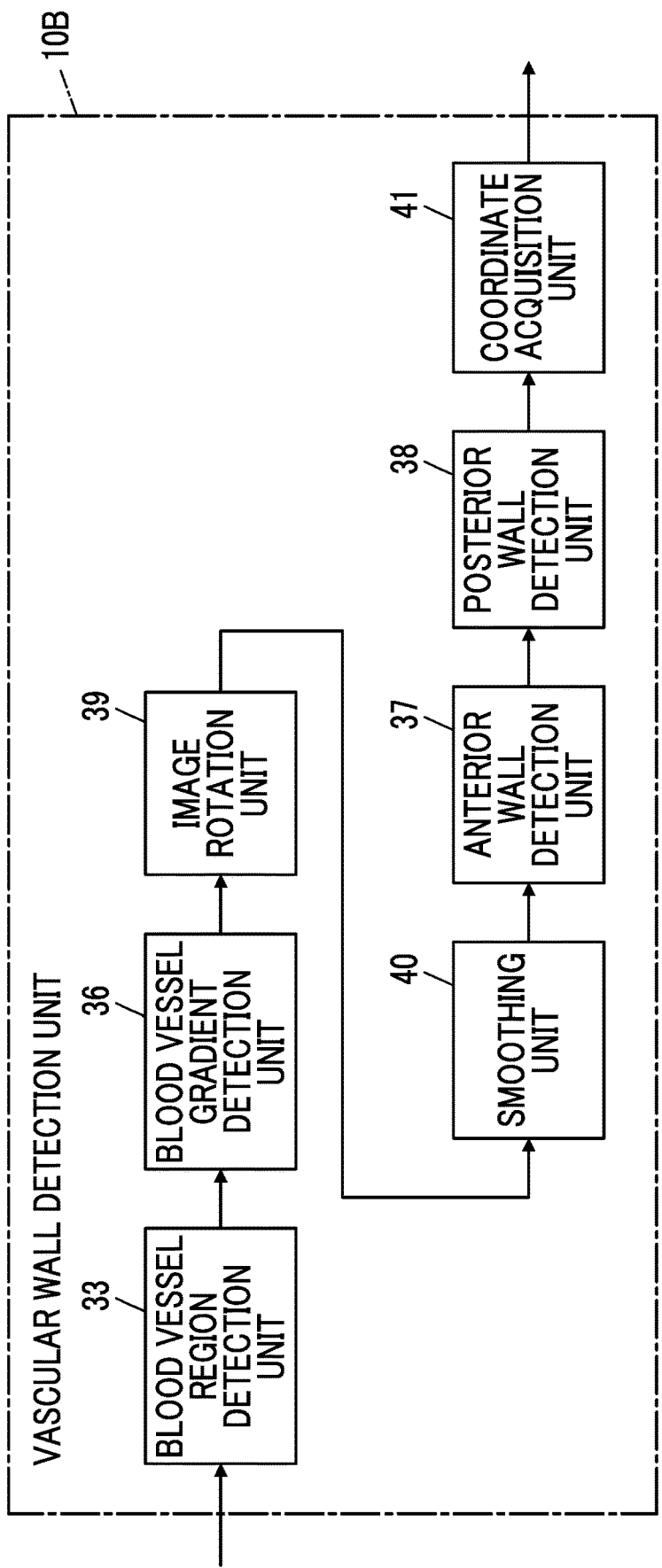
FIG. 15 is a block diagram illustrating an internal configuration of a vascular wall detection unit in a third embodiment of the invention.

FIG. 15 illustrates an internal configuration of a vascular wall detection unit 10B used in an ultrasound diagnostic apparatus according to a third embodiment. The vascular wall detection unit 10B has a configuration in which the blood vessel region detection unit 33, the blood vessel gradient detection unit 36, an image rotation unit 39, a smoothing unit 40, the anterior wall detection unit 37, the posterior wall detection unit 38, and a coordinate acquisition unit 41 are connected in series. The ultrasound diagnostic apparatus according to the third embodiment uses the vascular wall detection unit 10B instead of the vascular wall detection unit 10 in the ultrasound diagnostic apparatus 1 of the first embodiment illustrated in FIG. 1, and has the same configuration as the ultrasound diagnostic apparatus 1 of the first embodiment except the vascular wall detection unit 10B. Further, the blood vessel region detection unit 33 of the vascular wall detection unit 10B illustrated in FIG. 15 is the same as the blood vessel region detection unit 33 of the vascular wall detection unit 10 illustrated in FIG. 5, and the blood vessel gradient detection unit 36, the anterior wall detection unit 37, and the posterior wall detection unit 38 of the vascular wall detection unit 10B are the same as the blood vessel gradient detection unit 36, the anterior wall detection unit 37, and the posterior wall detection unit 38 of the vascular wall detection unit 10A illustrated in FIG. 12, respectively.

Figure 16:
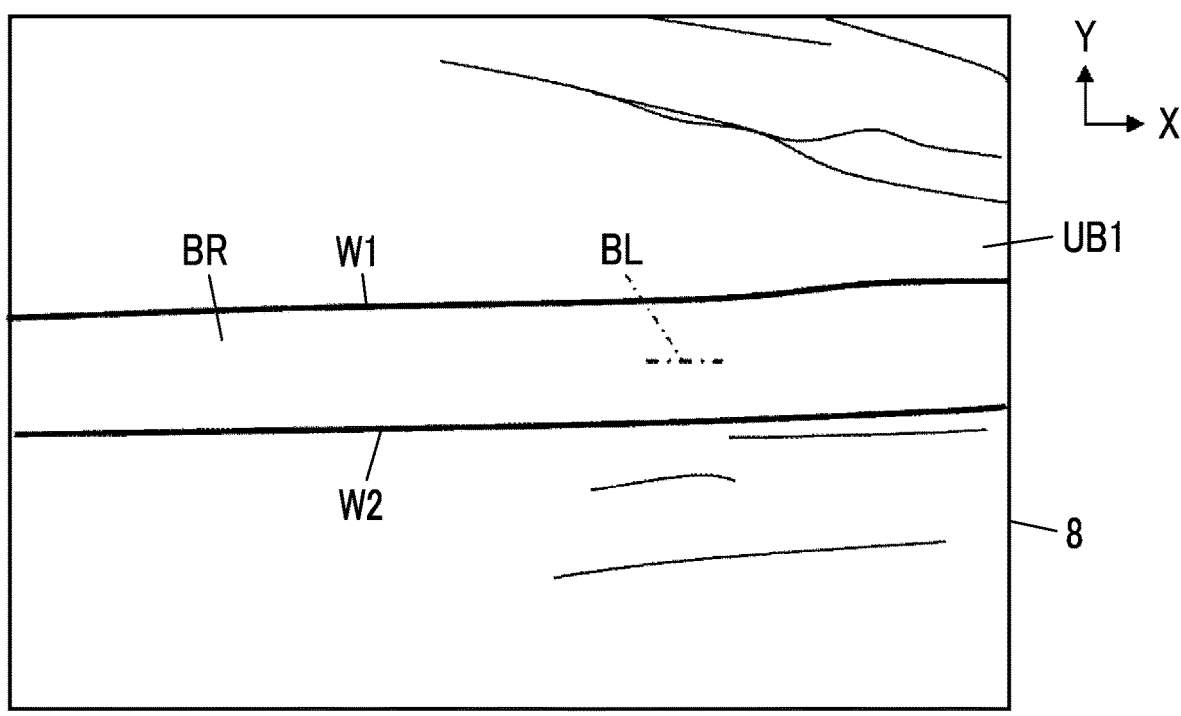
FIG. 16 is a diagram schematically illustrating a rotated B-mode image in the third embodiment of the invention.

The image rotation unit 39 of the vascular wall detection unit 10B rotates the B-mode image UB by the blood vessel gradient detected by the blood vessel gradient detection unit 36 such that the blood vessel region BR extends horizontally on the screen of the display unit 8. For example, the image rotation unit 39 rotates the B-mode image UB such that the blood vessel region BR extends horizontally on the screen of the display unit 8, that is, the blood vessel gradient line BL representing the blood vessel gradient extends along the X direction to acquire a B-mode image UB1 as illustrated in FIG. 16.

The smoothing unit 40 of the vascular wall detection unit 10B performs smoothing processing along the horizontal direction on the B-mode image UB1 acquired by the image rotation unit 39.

The anterior wall detection unit 37 and the posterior wall detection unit 38 of the vascular wall detection unit 10B respectively detect the anterior vascular wall W1 and the posterior vascular wall W2 in the B-mode image UB1 acquired by the image rotation unit 39 in the same manner as the anterior wall detection unit 37 and the posterior wall detection unit 38 of the vascular wall detection unit 10A in the second embodiment.

The coordinate acquisition unit 41 of the vascular wall detection unit 10B acquires coordinates of the anterior vascular wall W1 and the posterior vascular wall W2 in a case where the B-mode image UB1 acquired by the image rotation unit 39 is rotated reversely by the blood vessel gradient before being rotated by the image rotation unit 39 to be returned to the original B-mode image UB.

Figure 17:
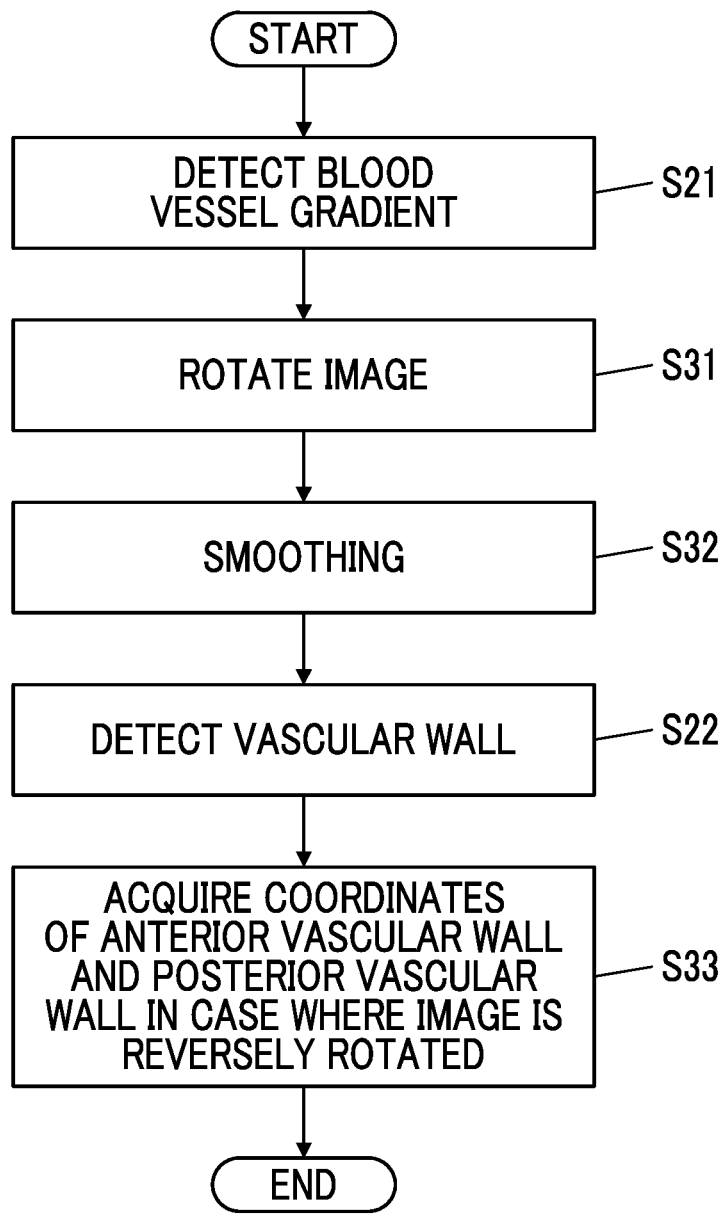
FIG. 17 is a flowchart illustrating a vascular wall detection operation in the third embodiment of the invention.

Next, a vascular wall detection operation in the third embodiment will be described using the flowchart illustrated in FIG. 17. In this flowchart, Step S21 and Step S22 are the same as Step S21 and Step S22 in the second embodiment illustrated in the flowchart of FIG. 14, respectively.

First, in Step S21, the blood vessel gradient detection unit 36 of the vascular wall detection unit 10B detects the blood vessel gradient line BL representing the blood vessel gradient by performing the image analysis on the blood vessel region BR on the B-mode image UB within a predetermined section including the designation position SP designated by the user through the operation unit 16.

Next, in Step S31, the image rotation unit 39 of the vascular wall detection unit 10B rotates the B-mode image UB by the blood vessel gradient such that the blood vessel region BR extends in the horizontal direction on the display unit 8, that is, the blood vessel gradient line BL detected in Step S21 extends along the X direction to acquire the B-mode image UB1. For example, as illustrated in FIG. 6, in the B-mode image UB, the blood vessel region BR extends in a direction inclined by the inclination of the blood vessel gradient line BL with respect to the horizontal direction on the screen of the display unit 8, that is, the X direction. Therefore, in a case where the B-mode image UB illustrated in FIG. 6 is rotated clockwise by the blood vessel gradient, the B-mode image UB1 in which the blood vessel region BR extends in the horizontal direction on the screen of the display unit 8, that is, the X direction as illustrated in FIG. 16 is acquired.

In subsequent Step S32, the smoothing unit 40 performs the smoothing processing along the horizontal direction on the B-mode image UB1. Here, the smoothing processing is processing for removing a noise in the B-mode image UB1 by smoothing the brightness value at each point of the B-mode image UB1, and the smoothing processing can be implemented by using smoothing filters such as moving average filters, Gaussian smoothing filters, and median filters, for example.

In the B-mode image UB1, since the blood vessel region BR extends in the horizontal direction, the anterior vascular wall W1 and the posterior vascular wall W2 also extend in the horizontal direction, and the blood vessel has a layered structure, it is possible to effectively and easily remove the noise by performing smoothing processing along the horizontal direction.

Figure 18:
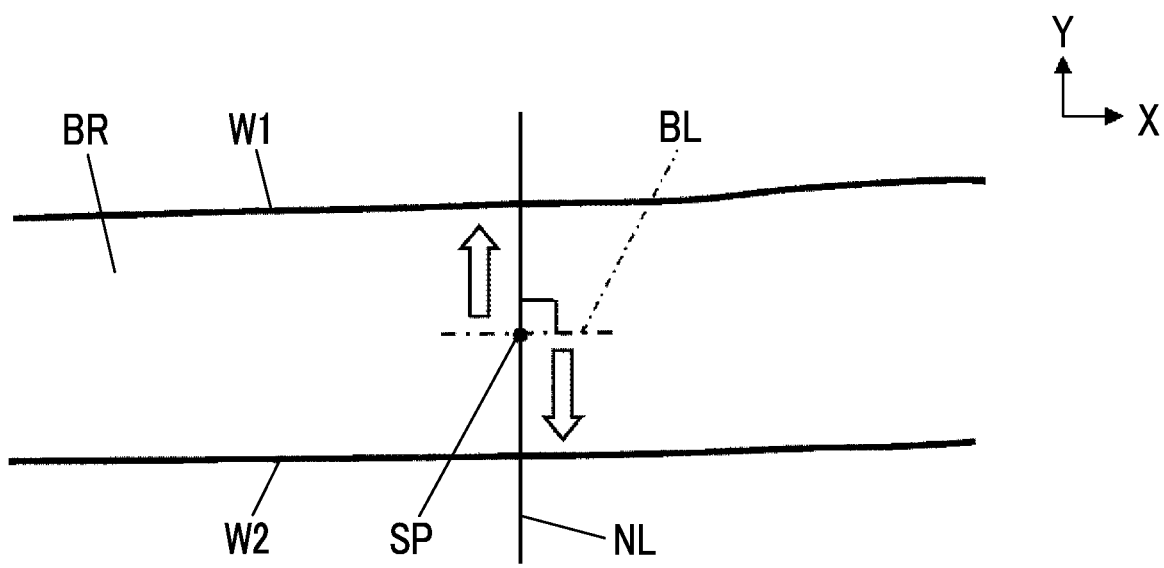
FIG. 18 is a diagram schematically illustrating a method of detecting a vascular wall by the vascular wall detection unit in the third embodiment of the invention.

In a case where the smoothing processing in Step S32 is ended, the anterior vascular wall W1 and the posterior vascular wall W2 on the B-mode image UB1 are detected by the anterior wall detection unit 37 and the posterior wall detection unit 38 in subsequent Step S22. In this case, for example, as illustrated in FIG. 18, the anterior wall detection unit 37 detects, as the anterior vascular wall W1, a location where the amount of change in B-mode intensity is the maximum value, in a range having a predetermined length from the designation position SP, which is designated by the user through the operation unit 16, in the shallow portion direction along the gradient perpendicular line NL perpendicular to the blood vessel gradient line BL. Here, as illustrated in FIG. 18, the blood vessel gradient line BL extends along the horizontal direction on the screen of the display unit 8, that is, the X direction, and the gradient perpendicular line NL extends along the vertical direction on the screen of the display unit 8, that is, the Y direction. Further, for example, in the same manner as in the anterior wall detection unit 37, the posterior wall detection unit 38 detects, as the posterior vascular wall W2, a location where the amount of change in B-mode intensity is the maximum value, in a range having a predetermined length from the designation position SP in the deep portion direction along the gradient perpendicular line NL.

In subsequent Step S33, the coordinate acquisition unit 41 acquires coordinates of the anterior vascular wall W1 and the posterior vascular wall W2 in a case where the B-mode image UB1 is rotated reversely by the inclination of the blood vessel gradient line BL in the B-mode image UB before being rotated in Step S31, that is, in a case where the B-mode image UB1 is rotated reversely such that the inclination of the blood vessel gradient line BL matches the original inclination. In this case, the coordinate acquisition unit 41 can calculate the coordinates of the anterior vascular wall W1 and the posterior vascular wall W2 in a case where the B-mode image UB1 is rotated reversely by the original inclination of the blood vessel gradient line BL, by performing a coordinate transform operation on the coordinates of the anterior vascular wall W1 and the posterior vascular wall W2 in the B-mode image UB1, for example.

In this manner, in a case where the coordinates of the anterior vascular wall W1 and the posterior vascular wall W2 are acquired in the B-mode image UB on which the smoothing processing has been performed, the vascular wall detection operation in the third embodiment is ended.

Figure 19:
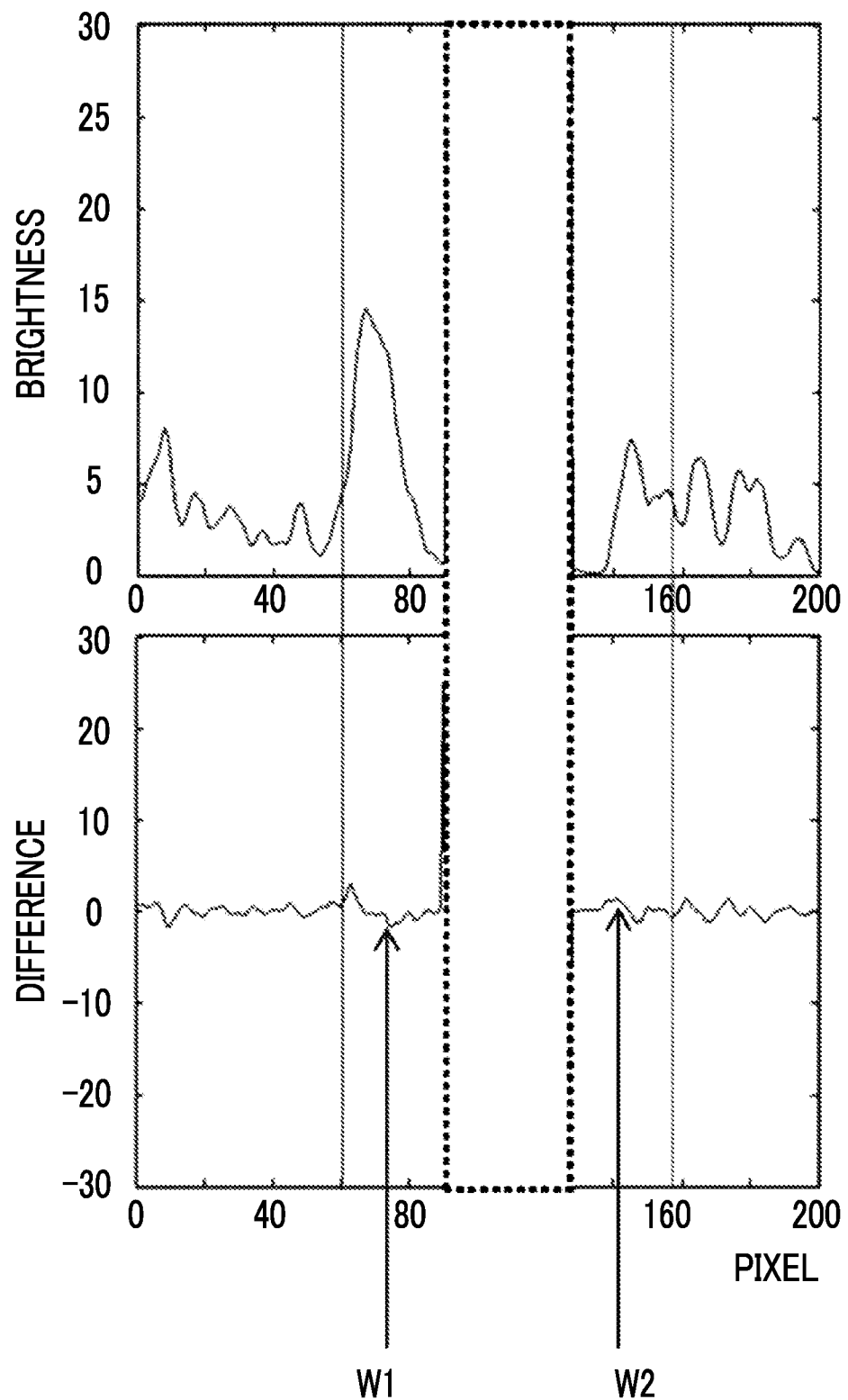
FIG. 19 is a diagram illustrating a profile of a B-mode image smoothed in a horizontal direction after being rotated.

Here, FIG. 19 illustrates an example of a brightness profile on the gradient perpendicular line NL and a profile of a difference (amount of change) of brightness at respective adjacent points on the gradient perpendicular line NL, in the B-mode image UB1 obtained by rotating the B-mode image UB by the blood vessel gradient and performing the smoothing processing along the horizontal direction, using the ultrasound diagnostic apparatus of the third embodiment. The anterior vascular wall W1 and the posterior vascular wall W2 are detected on the basis of the difference of brightness. The blood vessel diameter is calculated to be 3.67 mm from the detected anterior vascular wall W1 and posterior vascular wall W2.

Figure 20:
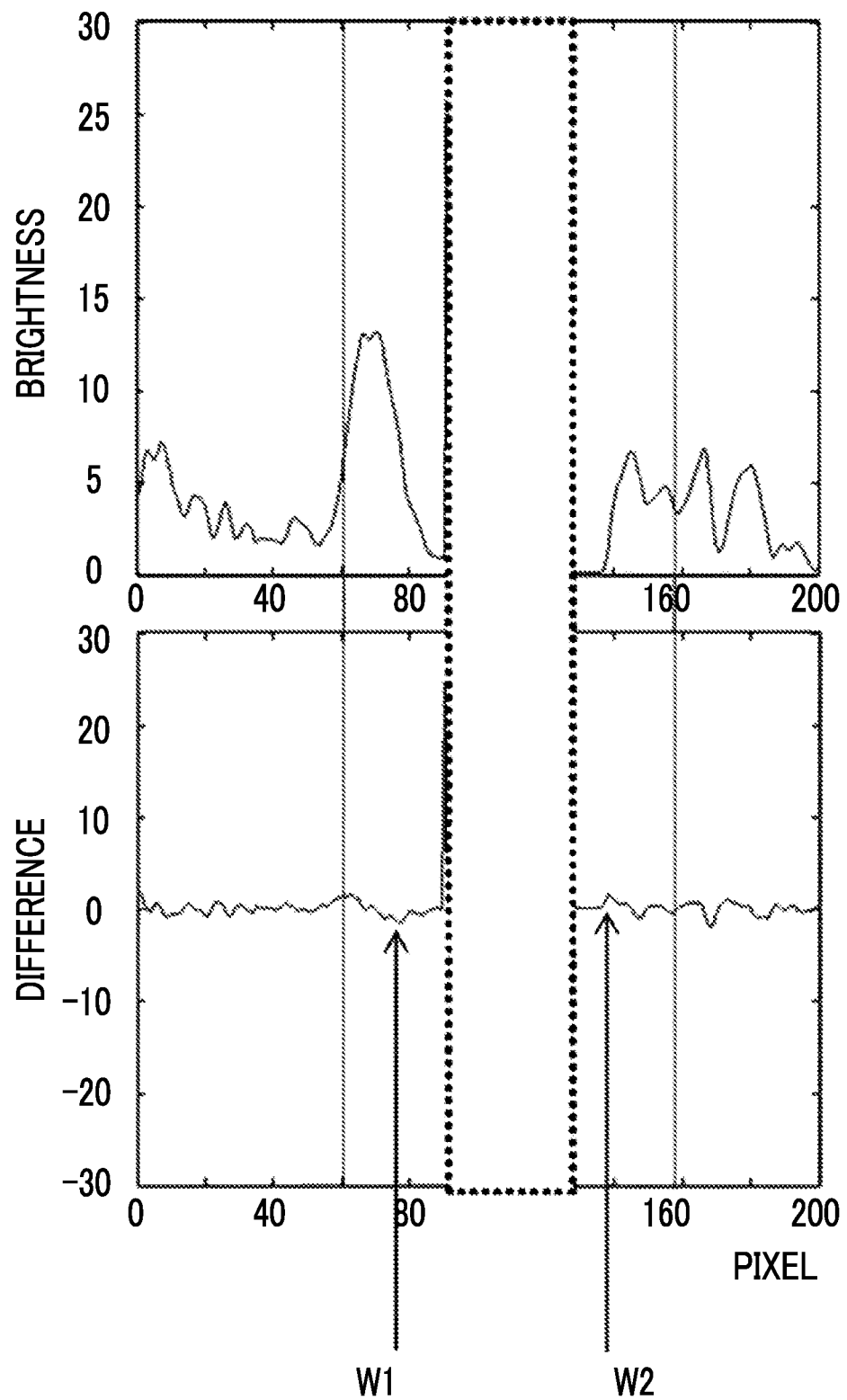
FIG. 20 is a diagram illustrating a profile of a rotated B-mode image after being smoothed in the horizontal direction.

On the other hand, FIG. 20 illustrates an example of a brightness profile on the same gradient perpendicular line NL and a profile of a difference (amount of change) of brightness at respective adjacent points on the gradient perpendicular line NL in a case where the same B-mode image UB is subjected to the smoothing processing along the horizontal direction and then is rotated by the original blood vessel gradient. The anterior vascular wall W1 and the posterior vascular wall W2 are detected on the basis of the difference of brightness, and the blood vessel diameter is calculated to be 3.39 mm from the detected anterior vascular wall W1 and posterior vascular wall W2. It can be seen that the brightness profile illustrated in FIG. 19 has a sharper shape than the brightness profile illustrated in FIG. 20.

Thus, in a case where the smoothing processing along the horizontal direction is performed on the B-mode image UB in which the blood vessel region BR extends in a direction inclined by the original blood vessel gradient with respect to the horizontal direction and then the B-mode image UB is rotated, the blood vessel diameter is calculated to be smaller than a case where the smoothing processing along the horizontal direction is performed on the B-mode image UB1 after being rotated.

In a case where the blood flow volume measured by the blood flow volume measurement unit 13 is compared in a case where the cross-sectional area of the blood vessel is calculated using the blood vessel diameter calculated by the brightness profile illustrated in FIG. 19 with a case where the cross-sectional area of the blood vessel is calculated using the blood vessel diameter calculated by the brightness profile illustrated in FIG. 20, the blood flow volume in the case of using the brightness profile illustrated in FIG. 19 is about 15% lower than the blood flow volume in the case of using the brightness profile illustrated in FIG. 20.

As described above, with the ultrasound diagnostic apparatus according to the third embodiment of the invention, since the B-mode image UB1 is acquired by rotating the B-mode image UB such that the blood vessel gradient line BL extends along the horizontal direction on the screen of the display unit 8, the smoothing processing in the horizontal direction is performed on the acquired B-mode image UB1, and then the coordinates of the anterior vascular wall W1 and the posterior vascular wall W2 in a case where the B-mode image UB1 is rotated reversely by the original blood vessel gradient are acquired, it is possible to accurately detect the anterior vascular wall W1 and the posterior vascular wall W2 and to measure an accurate blood flow volume.

In the third embodiment, an example has been described in which the coordinate acquisition unit 41 performs the coordinate transformation on the coordinates of the anterior vascular wall W1 and the posterior vascular wall W2 on the B-mode image UB1 to calculate the coordinates of the anterior vascular wall W1 and the posterior vascular wall W2 in the case of reversely rotating the B-mode image UB1 by the original blood vessel gradient, but a method of calculating the coordinates of the anterior vascular wall W1 and the posterior vascular wall W2 is not limited thereto. For example, the coordinate acquisition unit 41 can reversely rotate the B-mode image UB1 by the original blood vessel gradient to acquire the coordinates of the anterior vascular wall W1 and the posterior vascular wall W2 on the reversely rotated B-mode image.

Fourth Embodiment

Figure 21:
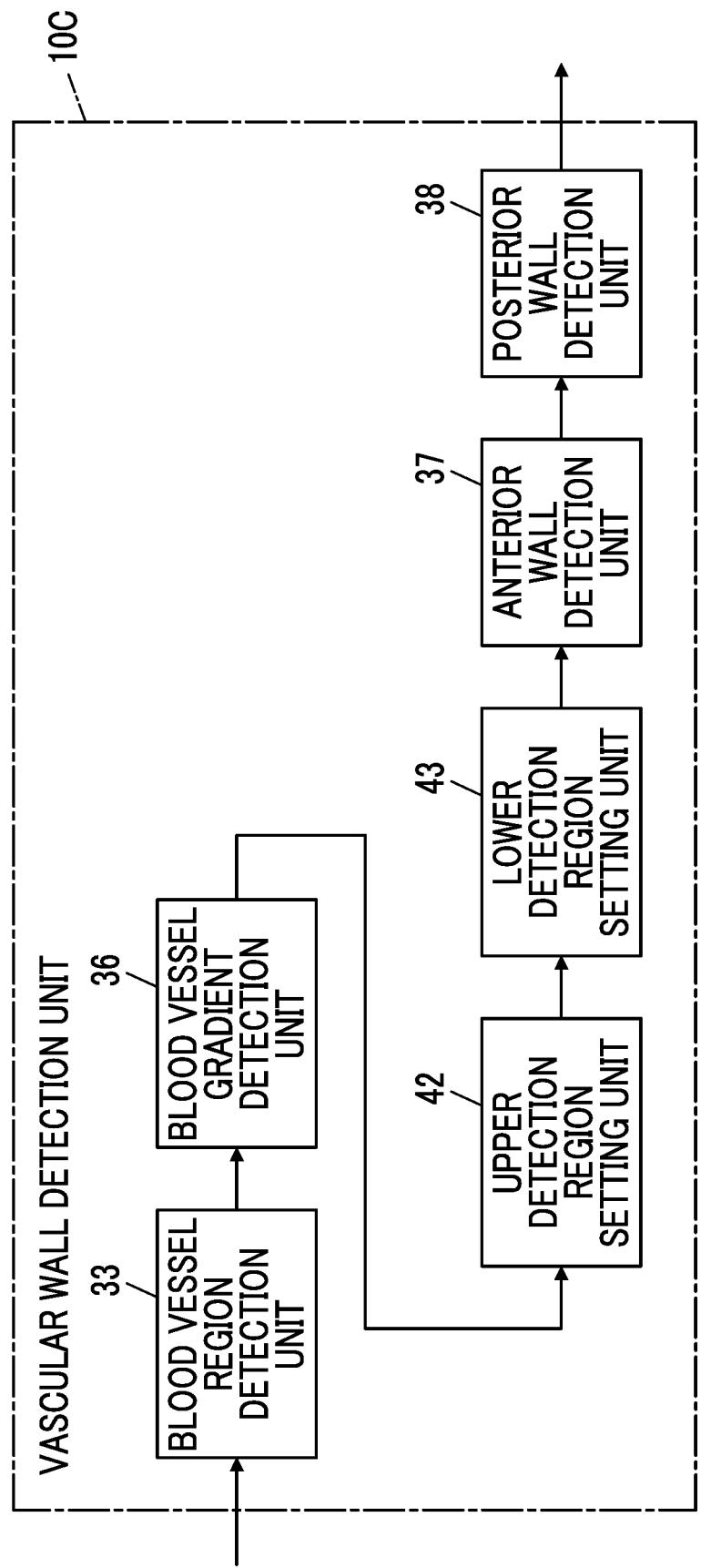
FIG. 21 is a block diagram illustrating an internal configuration of a vascular wall detection unit in a fourth embodiment of the invention.

FIG. 21 illustrates an internal configuration of a vascular wall detection unit 10C used in an ultrasound diagnostic apparatus according to a fourth embodiment. The vascular wall detection unit 10C has a configuration in which the blood vessel region detection unit 33, the blood vessel gradient detection unit 36, an upper detection region setting unit 42, a lower detection region setting unit 43, the anterior wall detection unit 37, and the posterior wall detection unit 38 are connected in series. The ultrasound diagnostic apparatus according to the fourth embodiment uses the vascular wall detection unit 10C instead of the vascular wall detection unit 10 in the ultrasound diagnostic apparatus 1 of the first embodiment illustrated in FIG. 1, and has the same configuration as the ultrasound diagnostic apparatus 1 of the first embodiment except the vascular wall detection unit 10C. Further, the blood vessel region detection unit 33 of the vascular wall detection unit 10C is the same as the blood vessel region detection unit 33 of the vascular wall detection unit 10 illustrated in FIG. 5, and the blood vessel gradient detection unit 36, the anterior wall detection unit 37, and the posterior wall detection unit 38 of the vascular wall detection unit 10C are the same as the blood vessel gradient detection unit 36, the anterior wall detection unit 37, and the posterior wall detection unit 38 of the vascular wall detection unit 10A illustrated in FIG. 12, respectively.

Figure 22:
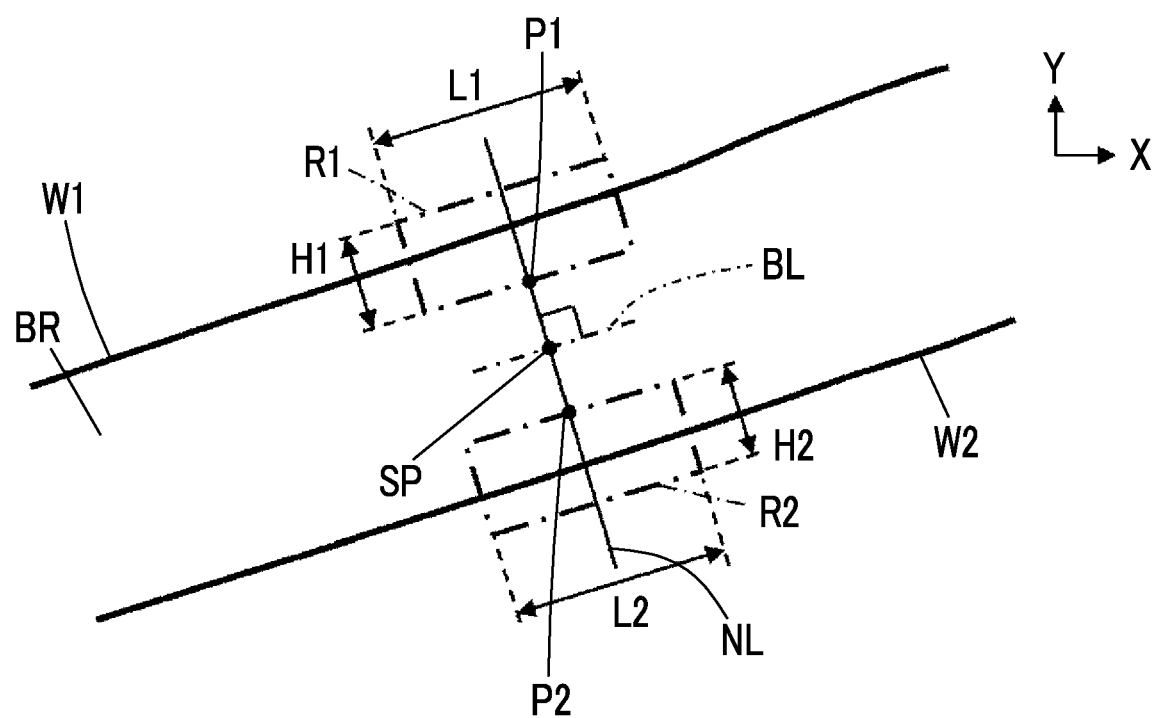
FIG. 22 is a diagram schematically illustrating a method of detecting a vascular wall by the vascular wall detection unit in the fourth embodiment of the invention.

As illustrated in FIG. 22, the upper detection region setting unit 42 of the vascular wall detection unit 10C sets an upper reference point P1 on the basis of the position of the contour of the blood vessel region BR, and sets an upper detection region R1 using the set upper reference point Pb as a reference. Here, the upper reference point Pb is a point which is closer to the shallow portion than the designation position SP and is set on the gradient perpendicular line NL, in the blood vessel region BR. Further, the upper detection region R1 is a region for searching for the anterior vascular wall W1, and has a rectangular shape that extends in the shallow portion direction by a length H1 from the upper reference point P1 along the gradient perpendicular line NL so as to traverse the inside and outside of the blood vessel region BR and extends along a direction parallel to the direction along the blood vessel gradient line BL by a length L1 such that the upper reference point P1 is in the center. Here, the upper reference point P1 is set to be positioned inside the blood vessel region BR by, for example, about 1 to 2 mm from the contour of the blood vessel region BR.

The lower detection region setting unit 43 of the vascular wall detection unit 10C sets a lower reference point P2 on the basis of the position of the contour of the blood vessel region BR, and sets a lower detection region R2 using the set lower reference point P2 as a reference. Here, the lower reference point P2 is a point which is closer to the deep portion than the designation position SP and is set on the gradient perpendicular line NL, in the blood vessel region BR. Further, the lower detection region R2 is a region for searching for the posterior vascular wall W2, and has a rectangular shape that extends from the lower reference point P2 in the deep portion direction along the gradient perpendicular line NL by a length H2 so as to traverse the inside and outside of the blood vessel region BR and extends along a direction parallel to the direction along the blood vessel gradient line BL by a length L2 such that the lower reference point P2 is in the center. Here, the lower reference point P2 is set to be positioned inside the blood vessel region BR by, for example, about 1 to 2 mm from the contour of the blood vessel region BR, in the same manner as the upper reference point Pb.

The anterior wall detection unit 37 can detect an anterior vascular wall boundary line on the basis of the intensity (brightness) of the B-mode image signal at each point and the amount of change in intensity of the B-mode image signal at each point in the upper detection region R1, and the posterior wall detection unit 38 can detect a posterior vascular wall boundary line on the basis of the intensity (brightness) of the B-mode image signal at each point and the amount of change in intensity of the B-mode image signal at each point in the lower detection region R2. For example, although not illustrated, the anterior wall detection unit 37 can detect, as the anterior vascular wall W1, a location where the amount of change in B-mode intensity is maximum, by performing the search on the search line parallel to the gradient perpendicular line NL in the shallow portion direction while moving the search line in a direction parallel to the blood vessel gradient line BL in the upper detection region R1. Similarly, the posterior wall detection unit 38 can detect, as the posterior vascular wall W2, a location where the amount of change in B-mode intensity is maximum, by performing the search on the search line parallel to the gradient perpendicular line NL in the deep portion direction while moving the search line in a direction parallel to the blood vessel gradient line BL in the lower detection region R2.

Further, the anterior vascular wall boundary line and the posterior vascular wall boundary line can be detected using dynamic programming based on an evaluation function including the intensity of the B-mode image signal at each point and the amount of change in intensity of the B-mode image signal at each point. Furthermore, the anterior vascular wall boundary line and the posterior vascular wall boundary line can be detected by using a pattern similarity based on the template indicating a reference pattern of the vascular wall as disclosed in WO2011/099102A1.

The anterior vascular wall boundary line and the posterior vascular wall boundary line can also be detected in a manner that, assuming a plurality of search lines extending parallel to the gradient perpendicular line NL in the upper detection region R1 and the lower detection region R2, a vascular wall boundary candidate point is decided on each search line, a first evaluation value representing accuracy of the decided vascular wall boundary candidate point as a vascular wall boundary point is calculated using brightness information, particularly intensity information, and edge information, a second evaluation value representing a similarity between the search line including the decided vascular wall boundary candidate point and an adjacent search line is calculated, and a third evaluation value for deciding the vascular wall boundary point from among the vascular wall boundary candidate points is calculated on the basis of the first evaluation value and the second evaluation value, for example, as disclosed in JP5844325B.

Here, as the "second evaluation value", a shift amount in a depth direction between the search lines of the decided vascular wall boundary candidate points can be used instead of the similarity. That is, the anterior vascular wall boundary line and the posterior vascular wall boundary line can be detected by deciding the vascular wall boundary candidate point on each search line, calculating the first evaluation value representing accuracy of the decided vascular wall boundary candidate point as the vascular wall boundary point, calculating the second evaluation value based on the shift amount in the depth direction between the search lines of the decided vascular wall boundary candidate points, and calculating the third evaluation value for deciding the vascular wall boundary point from among the vascular wall boundary candidate points on the basis of the first evaluation value and the second evaluation value.

Figure 23:
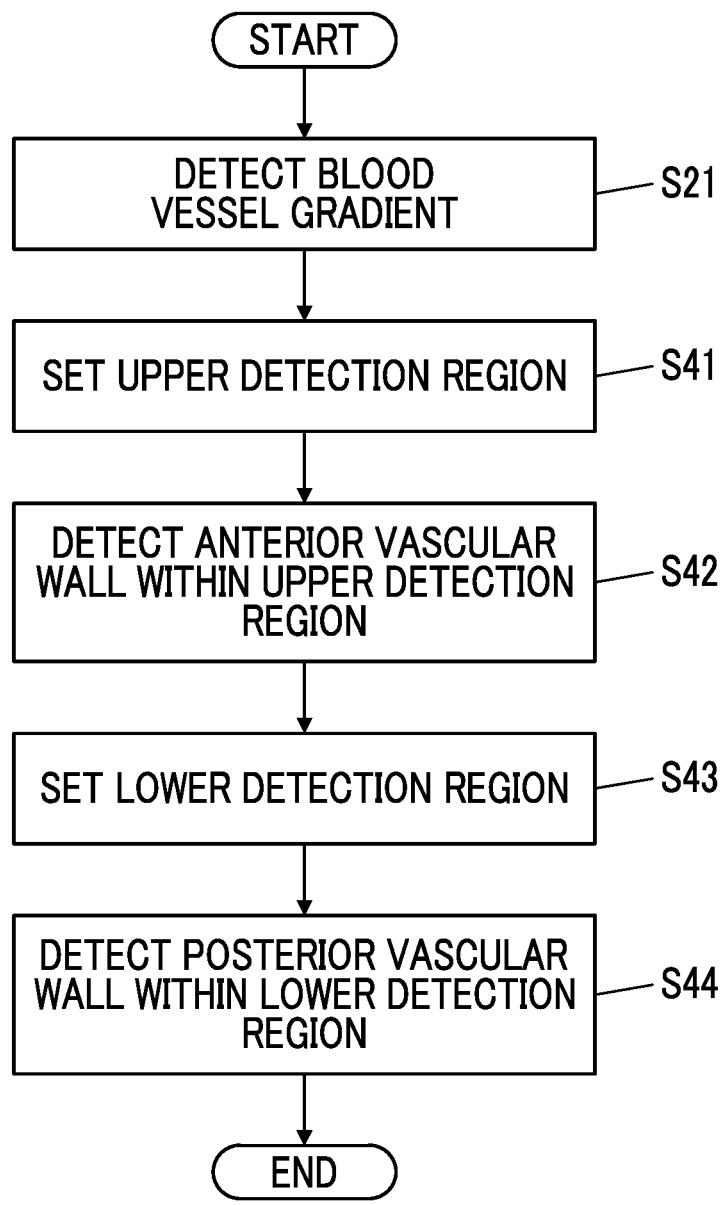
FIG. 23 is a flowchart illustrating a vascular wall detection operation in the fourth embodiment of the invention.

Next, a vascular wall detection operation in the fourth embodiment will be described using the flowchart illustrated in FIG. 23. In this flowchart, Step S21 is the same as Step S21 in the second embodiment illustrated in FIG. 14.

First, in Step S21, the blood vessel gradient detection unit 36 of the vascular wall detection unit 10C detects the blood vessel gradient line BL representing the blood vessel gradient by performing the image analysis on the blood vessel region BR within a predetermined range including the designation position SP designated by the user through the operation unit 16.

Next, in Step S41, the upper detection region setting unit 42 of the vascular wall detection unit 10C sets the upper reference point P1 which is closer to the shallow portion than the designation position SP and is on the gradient perpendicular line NL, within the blood vessel region BR, and sets the upper detection region R1 on the B-mode image using the set upper reference point P1 as a reference.

In subsequent Step S42, the anterior wall detection unit 37 of the vascular wall detection unit 10C searches the upper detection region R1 on the B-mode image set in Step S41 to detect the anterior vascular wall W1.

In Step S43, the lower detection region setting unit 43 of the vascular wall detection unit 10C sets the lower reference point P2 which is closer to the deep portion than the designation position SP and is on the gradient perpendicular line NL, within the blood vessel region BR, and sets the lower detection region R2 on the B-mode image using the set lower reference point P2 as a reference.

In subsequent Step S44, the posterior wall detection unit 38 of the vascular wall detection unit 10C searches the lower detection region R2 on the B-mode image set in Step S43 to detect the posterior vascular wall W2.

In this manner, in a case where the anterior vascular wall W1 and the posterior vascular wall W2 are detected, the vascular wall detection operation in the fourth embodiment is ended.

As described above, with the ultrasound diagnostic apparatus according to the fourth embodiment, since the upper detection region R1 and the lower detection region R2 are set respectively using the upper reference point P1 and the lower reference point P2 set inside the blood vessel region BR as a reference, and the anterior vascular wall W1 and the posterior vascular wall W2 are detected in the upper detection region R1 and the lower detection region R2, it is possible to accurately detect the anterior vascular wall W1 and the posterior vascular wall W2 without erroneously detecting a maximum point, for example, even in a case where the maximum point of the B-mode intensity appears due to the multiple reflection of the ultrasonic waves, within the blood vessel region BR.

The length H1 and the length L1 of the upper detection region R1 may have the same values as or different values from the length H2 and the length L2 of the lower detection region R2. The upper detection region R1 and the lower detection region R2 are not limited to the rectangular shape, and there is no limitation on the shape of the upper detection region R1 and the lower detection region R2.

In the fourth embodiment, as with the third embodiment, the anterior vascular wall W1 and the posterior vascular wall W2 can be detected by performing the smoothing processing in the horizontal direction on the B-mode image UB1 acquired by rotating the B-mode image UB by the blood vessel gradient and then searching the upper detection region R1 and the lower detection region R2. By doing so, it is possible to more accurately detect the anterior vascular wall W1 and the posterior vascular wall W2 and to measure an accurate blood flow volume.

Fifth Embodiment

Figure 24:
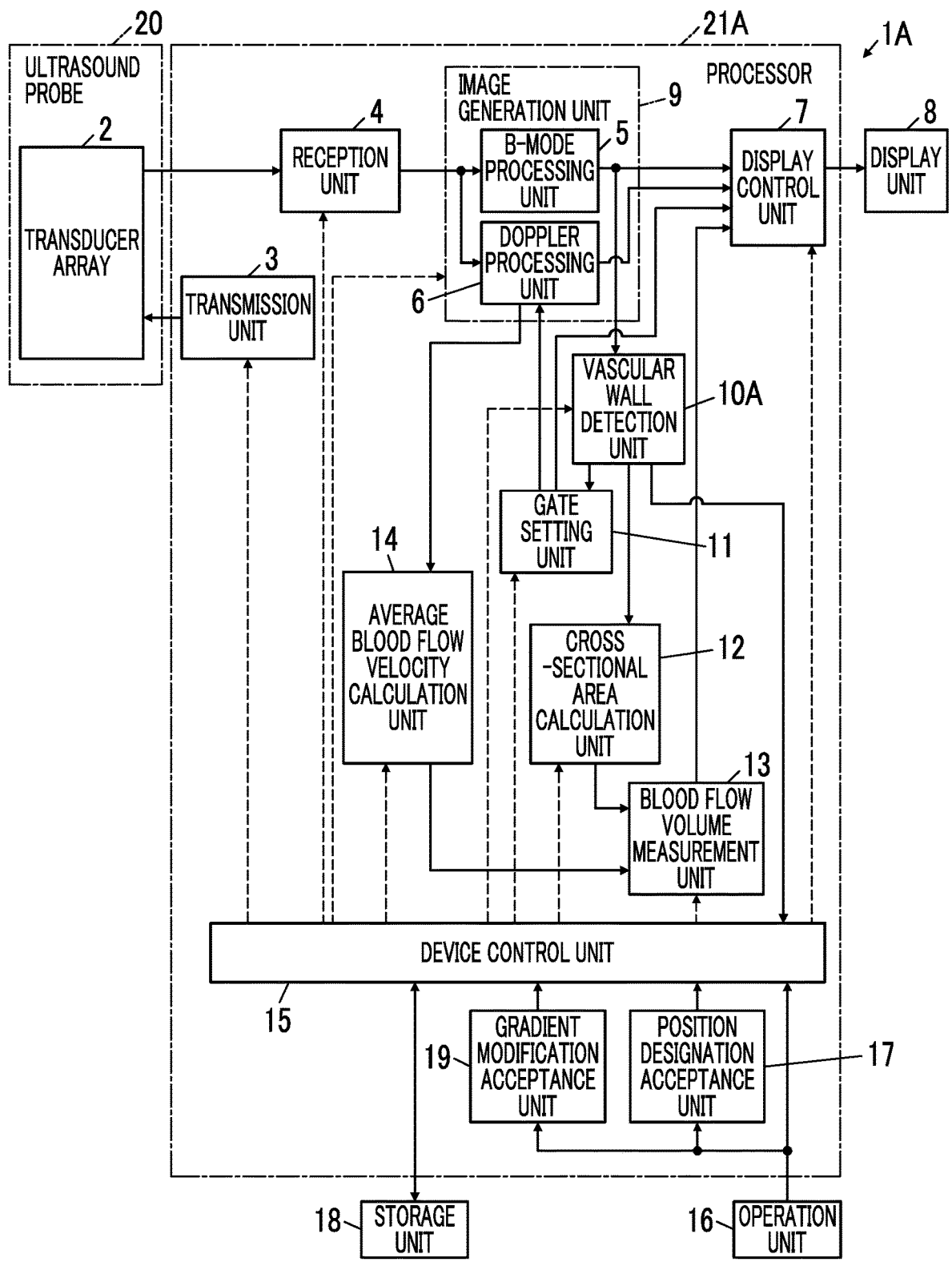
FIG. 24 is a block diagram illustrating a configuration of an ultrasound diagnostic apparatus according to a fifth embodiment of the invention.

FIG. 24 illustrates a configuration of an ultrasound diagnostic apparatus 1A according to a fifth embodiment. In the ultrasound diagnostic apparatus 1A, the vascular wall detection unit 10A in the second embodiment illustrated in FIG. 12 is used instead of the vascular wall detection unit 10 in the ultrasound diagnostic apparatus 1 of the first embodiment illustrated in FIG. 1, and a gradient modification acceptance unit 19 is further provided.

In the ultrasound diagnostic apparatus 1A according to the fifth embodiment, the gradient modification acceptance unit 19 is connected to the operation unit 16, and the device control unit 15 is connected to the gradient modification acceptance unit 19. Further, the transmission unit 3, the reception unit 4, the display control unit 7, the image generation unit 9, the vascular wall detection unit 10A, the gate setting unit 11, the cross-sectional area calculation unit 12, the blood flow volume measurement unit 13, the average blood flow velocity calculation unit 14, the device control unit 15, the position designation acceptance unit 18, and the gradient modification acceptance unit 19 constitute a processor 21A.

Here, the blood vessel gradient line BL approximately parallel to the traveling direction of the blood vessel is automatically detected by the blood vessel gradient detection unit 36 of the vascular wall detection unit 10A within a predetermined range including the designation position SP designated by the user through the operation unit 16, but in the fifth embodiment, it is possible for the user to finely adjust the inclination of the blood vessel gradient line BL through the operation unit 16. In this case, for example, a gradient modification dial can be used as the operation unit 16, and it is possible for the user to change the inclination of the blood vessel gradient line BL by rotating the gradient modification dial. The gradient modification acceptance unit 19 of the processor 21A accepts a modification of the inclination of the blood vessel gradient line BL by the user through the operation unit 16.

The anterior wall detection unit 37 and the posterior wall detection unit 38 of the vascular wall detection unit 10A detect again the anterior vascular wall W1 and the posterior vascular wall W2 by performing the search in a direction perpendicular to the modified inclination of the blood vessel gradient line BL on the basis of the modification of the inclination of the blood vessel gradient line BL by the user, which has been accepted by the gradient modification acceptance unit 19.

The cross-sectional area calculation unit 12 of the processor 21A calculates again the blood vessel diameter on the basis of the positions of the anterior vascular wall W1 and the posterior vascular wall W2 detected by the anterior wall detection unit 37 and the posterior wall detection unit 38, and calculates the cross-sectional area of the blood vessel on the basis of the calculated blood vessel diameter.

The average blood flow velocity calculation unit 14 of the processor 21A calculates again the average blood flow velocity on the basis of the inclination of the blood vessel gradient line BL modified by the user through the operation unit 16.

The blood flow volume measurement unit 13 of the processor 21A calculates again the blood flow volume VF on the basis of the cross-sectional area of the blood vessel which is calculated again by the cross-sectional area calculation unit 12 and the average blood flow velocity which is calculated again by the average blood flow velocity calculation unit 14, using Equation (1).

As described above, with the ultrasound diagnostic apparatus 1A according to the fifth embodiment, since the blood vessel gradient automatically detected by the blood vessel gradient detection unit 36 of the vascular wall detection unit 10A is modified by the user through the operation unit 16 and the blood flow volume VF is calculated on the basis of the modified blood vessel gradient, it is possible to obtain a more accurate blood flow volume VF.

In the fifth embodiment, a case where the gradient modification dial is used as the operation unit 16 has been described as an example of a method of modifying the inclination of the blood vessel gradient line BL, but there is no limitation on the method as long as the user can modify the inclination of the blood vessel gradient line BL by a manual operation. For example, a gradient modification button for adjusting the inclination of the blood vessel gradient line BL can be used as the operation unit 16, and it is possible for the user to finely adjust the inclination of the blood vessel gradient line BL by changing the inclination of the blood vessel gradient line BL by a predetermined angle each time the user presses the gradient modification button. In a case where the operation unit 16 is configured by the touch panel and the touch panel is built in the display unit 8, it is possible to finely adjust the inclination of the blood vessel gradient line BL by displaying a virtual gradient modification dial, a virtual gradient modification button, and the like on the display unit 8, and causing the user to operate the virtual gradient modification dial, the virtual gradient modification button, and the like.

In the fifth embodiment, the anterior vascular wall W1 and the posterior vascular wall W2 are detected again on the basis of the inclination of the blood vessel gradient line BL which is finely adjusted by the user through the operation unit 16, but the blood flow volume can be measured again without detecting again the anterior vascular wall W1 and the posterior vascular wall W2. In this case, the average blood flow velocity can be calculated again by the average blood flow velocity calculation unit 14 by changing the scale of the pulse-Doppler in the Doppler processing unit 6 on the basis of the finely adjusted inclination of the blood vessel gradient line BL, and the blood flow volume measurement unit 13 can measure again the blood flow volume using the average blood flow velocity and the cross-sectional area of the blood vessel calculated by the cross-sectional area calculation unit 12 before the inclination of the blood vessel gradient line BL is finely adjusted.

The ultrasound diagnostic apparatuses according to the above-described first to fifth embodiments can be applied to a portable ultrasound diagnostic apparatus in which a touch sensor is combined with the display unit 8 and the touch sensor is used as the operation unit 16. Such a portable ultrasound diagnostic apparatus is also effective for outdoor diagnosis in a case of emergency treatment and the like.

EXPLANATION OF REFERENCES

1: ultrasound diagnostic apparatus
2: transducer array
3: transmission unit
4: reception unit
5: B-mode processing unit
6: Doppler processing unit
7: display control unit
8: display unit
9: image generation unit
10, 10A, 10B, 10C: vascular wall detection unit
11: gate setting unit
12: cross-sectional area calculation unit
13: blood flow volume measurement unit
14: average blood flow velocity calculation unit
15: device control unit
16: operation unit
17: storage unit
18: position designation acceptance unit
19: gradient modification acceptance unit
20: ultrasound probe
21, 21A: processor
22: amplification unit
23: AD conversion unit
24: beam former
25: signal processing unit
26: DSC
27: image processing unit
28: quadrature detection unit
29: high-pass filter
30: fast Fourier transformer
31: Doppler waveform image generation unit
32: data memory
33: blood vessel region detection unit
34: closed section setting unit
35: closed section search unit
36: blood vessel gradient detection unit
37: anterior wall detection unit
38: posterior wall detection unit
39: image rotation unit
40: smoothing unit
41: coordinate acquisition unit
42: upper detection region setting unit 43: lower detection region setting unit
A1: cursor steering angle
BL: blood vessel gradient line
BR: blood vessel region
C: center position
DB: blood vessel diameter
DG: Doppler gate
EP1, EP2: edge point
H1, H2, L1, L2: length
MV: measurement value
NL: gradient perpendicular line
P1: upper reference point
P2: lower reference point
R: closed section
R1: upper detection region
R2: lower detection region
RL, RL1, RL2: search line
SL: scan line
SP: designation position
SV: vertical line
UB, UB1: B-mode image
UD: Doppler waveform image
W1: anterior vascular wall
W2: posterior vascular wall
X, Y: direction

What is claimed is:

1. An ultrasound diagnostic apparatus comprising:
a display that displays a B-mode image in which at least a blood vessel region is imaged, where the blood vessel region represents a cross section of a blood vessel along with an extending direction of the blood vessel and has an upper contour and a lower contour which are apart from each other; and
a processor configured to:
detect a blood vessel region on the B-mode image by performing an image analysis on the B-mode image;
accept designation of a position in the blood vessel region on the B-mode image from a user;
upon accepting the designated position, automatically perform a process including at least:
setting an upper detection region surrounding the upper contour positioned on an upper side of the blood vessel region relative to the designation position;
setting a lower detection region surrounding the lower contour positioned on a lower side of the blood vessel region relative to the designation position;
detecting an anterior vascular wall within the upper detection region;
detecting a posterior vascular wall within the lower detection region;
calculating a cross-sectional area of a blood vessel on the basis of the anterior vascular wall and the posterior vascular wall;
setting a Doppler gate within the blood vessel region on the B-mode image on the basis of the anterior vascular wall and the posterior vascular wall;
calculating a blood flow velocity on the basis of Doppler data in the Doppler gate; and
measuring a blood flow volume on the basis of the cross-sectional area of the blood vessel and the blood flow velocity, and display a measurement result on the display,
wherein the upper detection region:
is set only on the upper side of the designation position; and
has a first rectangular shape of a predetermined first size, and the lower detection region:
is set only on the lower side of the designation position; and
has a second rectangular shape of a predetermined second size.

2. The ultrasound diagnostic apparatus according to claim 1,
wherein the processor is configured to detect a blood vessel gradient on the basis of the blood vessel region, and detect the anterior vascular wall and the posterior vascular wall by performing search in a direction perpendicular to the blood vessel gradient.

3. The ultrasound diagnostic apparatus according to claim 2,
wherein the processor is configured to detect the anterior vascular wall and the posterior vascular wall by performing search along a gradient perpendicular line extending perpendicular to the blood vessel gradient.

4. The ultrasound diagnostic apparatus according to claim 3,
wherein the processor is further configured to:
rotate the B-mode image by the blood vessel gradient such that the blood vessel region extends horizontally, and
perform smoothing processing along a horizontal direction on the B-mode image rotated by the processor, and
the processor detects the anterior vascular wall and the posterior vascular wall on the B-mode image smoothed by the processor.

5. The ultrasound diagnostic apparatus according to claim 3,
wherein the processor is further configured to:
accept a modification of the blood vessel gradient by the user, and
detect again the anterior vascular wall and the posterior vascular wall by performing search in a direction perpendicular to the blood vessel gradient modified on the basis of the modification of the blood vessel gradient by the user.

6. The ultrasound diagnostic apparatus according to claim 3,
wherein the processor is configured to set the Doppler gate such that the Doppler gate is positioned on an inner side of the anterior vascular wall and the posterior vascular wall.

7. The ultrasound diagnostic apparatus according to claim 2,
wherein the processor is further configured to:
rotate the B-mode image by the blood vessel gradient such that the blood vessel region extends horizontally, and
perform smoothing processing along a horizontal direction on the B-mode image rotated by the processor, and
the processor detects the anterior vascular wall and the posterior vascular wall on the B-mode image smoothed by the processor.

8. The ultrasound diagnostic apparatus according to claim 2,
wherein the processor is further configured to:
accept a modification of the blood vessel gradient by the user, and
detect again the anterior vascular wall and the posterior vascular wall by performing search in a direction perpendicular to the blood vessel gradient modified on the basis of the modification of the blood vessel gradient by the user.

9. The ultrasound diagnostic apparatus according to claim 2,
wherein the processor is configured to set the Doppler gate such that the Doppler gate is positioned on an inner side of the anterior vascular wall and the posterior vascular wall.

10. The ultrasound diagnostic apparatus according to claim 2,
wherein the processor is further configured to:
calculate an average blood flow velocity for one heartbeat period on the basis of the blood flow velocity, and
measure a blood flow volume on the basis of the cross-sectional area of the blood vessel and the average blood flow velocity.

11. The ultrasound diagnostic apparatus according to claim 2,
wherein the processor is configured to generate a Doppler waveform image on the basis of the Doppler data in the Doppler gate, and
the display is configured to display the B-mode image and the Doppler waveform image.

12. The ultrasound diagnostic apparatus according to claim 1,
wherein the processor is further configured to:
rotate the B-mode image by a blood vessel gradient such that the blood vessel region extends horizontally, and
perform smoothing processing along a horizontal direction on the B-mode image rotated by the processor, and
the processor detects the anterior vascular wall and the posterior vascular wall on the B-mode image smoothed by the processor.

13. The ultrasound diagnostic apparatus according to claim 1,
wherein the processor is configured to set the Doppler gate such that the Doppler gate is positioned on an inner side of the anterior vascular wall and the posterior vascular wall.

14. The ultrasound diagnostic apparatus according to claim 1,
wherein the processor is further configured to:
calculate an average blood flow velocity for one heartbeat period on the basis of the blood flow velocity, and
measure a blood flow volume on the basis of the cross-sectional area of the blood vessel and the average blood flow velocity.

15. The ultrasound diagnostic apparatus according to claim 1,
wherein the processor is configured to generate a Doppler waveform image on the basis of the Doppler data in the Doppler gate, and
the display is configured to display the B-mode image and the Doppler waveform image.

16. A control method of an ultrasound diagnostic apparatus, the control method comprising:
displaying a B-mode image in which at least a blood vessel region is imaged on a display, where the blood vessel region represents a cross section of a blood vessel along with an extending direction of the blood vessel and has an upper contour and a lower contour which are apart from each other;
detecting a blood vessel region on the B-mode image by performing an image analysis on the B-mode image;
accepting designation of a position in the blood vessel region on the B-mode image from a user;
upon accepting the designated position, automatically performing a process including at least:
setting an upper detection region surrounding the upper contour positioned on an upper side of the blood vessel region relative to the designation position;
setting a lower detection region surrounding the lower contour positioned on a lower side of the blood vessel region relative to the designation position;
detecting an anterior vascular wall within the upper detection region;
detecting a posterior vascular wall within the lower detection region;
calculating a cross-sectional area of a blood vessel on the basis of the detected anterior vascular wall and the detected posterior vascular wall;
setting a Doppler gate within the blood vessel region on the B-mode image on the basis of the anterior vascular wall and the posterior vascular wall;
calculating a blood flow velocity on the basis of Doppler data in the Doppler gate; and
measuring a blood flow volume on the basis of the calculated cross-sectional area of the blood vessel and the calculated blood flow velocity, and displaying a measurement result,
wherein the upper detection region:
is set only on the upper side of the designation position; and
has a first rectangular shape of a predetermined first size, and
the lower detection region:
is set only on the lower side of the designation position; and
has a second rectangular shape of a predetermined second size.

* * * * *